(12) United States Patent
Sweeny et al.

(10) Patent No.: US 12,049,328 B2
(45) Date of Patent: Jul. 30, 2024

(54) EMERGENCY UAV FACILITY

(71) Applicant: Flirtey Holdings, Inc., Reno, NV (US)

(72) Inventors: Matthew Sweeny, Reno, NV (US); John R. Foggia, Reno, NV (US); Jess Hayden, Reno, NV (US); Joseph Rinaldi, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 505 days.

(21) Appl. No.: 17/199,154

(22) Filed: Mar. 11, 2021

(65) Prior Publication Data

US 2021/0197982 A1 Jul. 1, 2021

Related U.S. Application Data

(63) Continuation of application No. PCT/US2019/051084, filed on Sep. 13, 2019.

(60) Provisional application No. 62/731,567, filed on Sep. 14, 2018.

(51) Int. Cl.

| B64F 1/222 | (2024.01) |
|---|---|
| B60P 3/11 | (2006.01) |
| B64C 39/02 | (2023.01) |
| B64F 1/00 | (2024.01) |
| B64F 5/40 | (2017.01) |
| B64U 80/86 | (2023.01) |

(52) U.S. Cl.
CPC ............. *B64F 1/222* (2013.01); *B60P 3/11* (2013.01); *B64F 1/005* (2013.01); *B64F 5/40* (2017.01); *B64C 39/024* (2013.01); *B64U 80/86* (2023.01)

(58) Field of Classification Search
CPC .. B64F 1/222; B64F 1/005; B64F 5/40; B60P 3/11; B64U 80/86; B64C 39/024
See application file for complete search history.

(56) References Cited

U.S. PATENT DOCUMENTS

| 8,201,871 | B1 * | 6/2012 | Rydberg | B60J 5/14 |
| | | | | 296/24.45 |
| 8,983,682 | B1 | 3/2015 | Peeters et al. | |
| 9,481,458 | B2 * | 11/2016 | Caballero | B64C 39/024 |
| 9,718,564 | B1 * | 8/2017 | Beckman | B64F 5/40 |
| 9,815,633 | B1 | 11/2017 | Kisser et al. | |
| 10,266,346 | B1 * | 4/2019 | Kisser | G01M 17/00 |
| 11,168,487 | B2 * | 11/2021 | Wankewycz | H02J 7/0042 |
| 2016/0200438 | A1 * | 7/2016 | Bokeno | G05D 1/102 |
| | | | | 244/2 |
| 2016/0229299 | A1 * | 8/2016 | Streett | B64C 39/024 |
| 2016/0364989 | A1 * | 12/2016 | Speasl | G08G 5/0082 |

(Continued)

FOREIGN PATENT DOCUMENTS

DE 102018113635 A1 12/2019

OTHER PUBLICATIONS

International Search Report and Written Opinion dated Apr. 16, 2020 for PCT Application No. PCT/US2019/051084.

*Primary Examiner* — Tien Q Dinh
*Assistant Examiner* — Katherine June Bolek
(74) *Attorney, Agent, or Firm* — EIP US LLP

(57) ABSTRACT

Unmanned aerial vehicle (UAV) facilities, suitable for use by both emergency and non-emergency UAVs, comprise a housing having first and second moveable platforms. The second moveable platform is arranged adjacent the first moveable platform. A cover is arranged above the second moveable platform. A drive system operates the first and second moveable platforms and the cover.

24 Claims, 14 Drawing Sheets

(56) References Cited

U.S. PATENT DOCUMENTS

2017/0092109 A1    3/2017    Trundle et al.
2017/0096222 A1*  4/2017    Spinelli ................ B64C 39/024

* cited by examiner

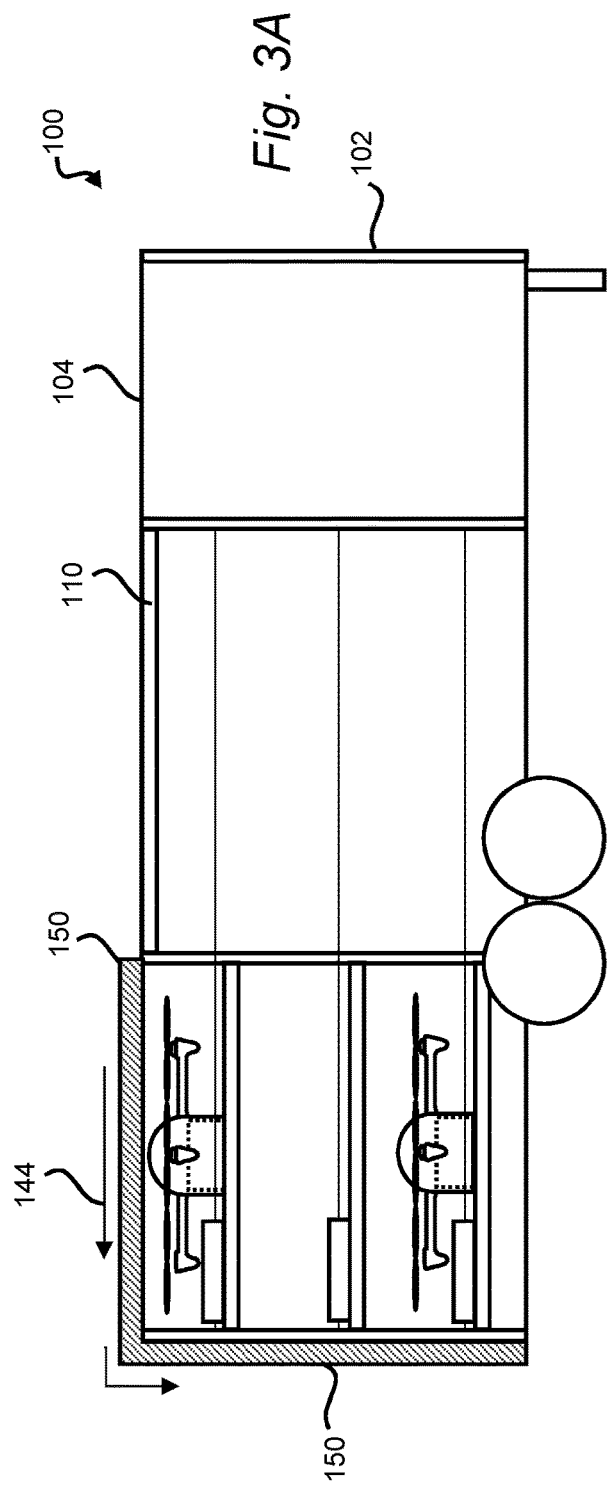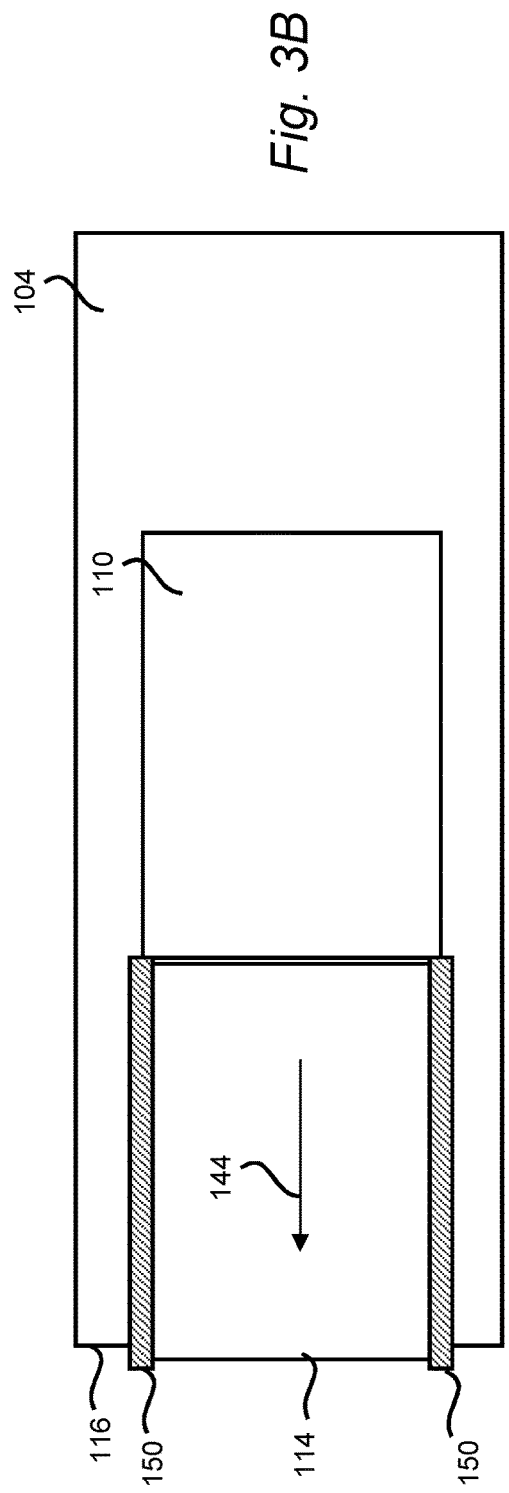

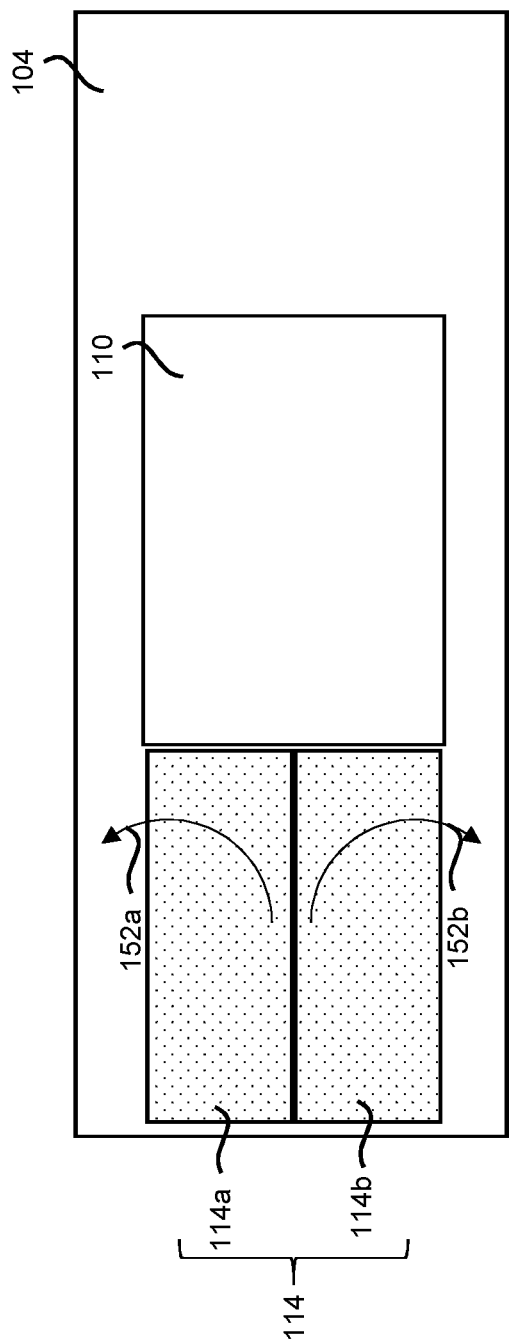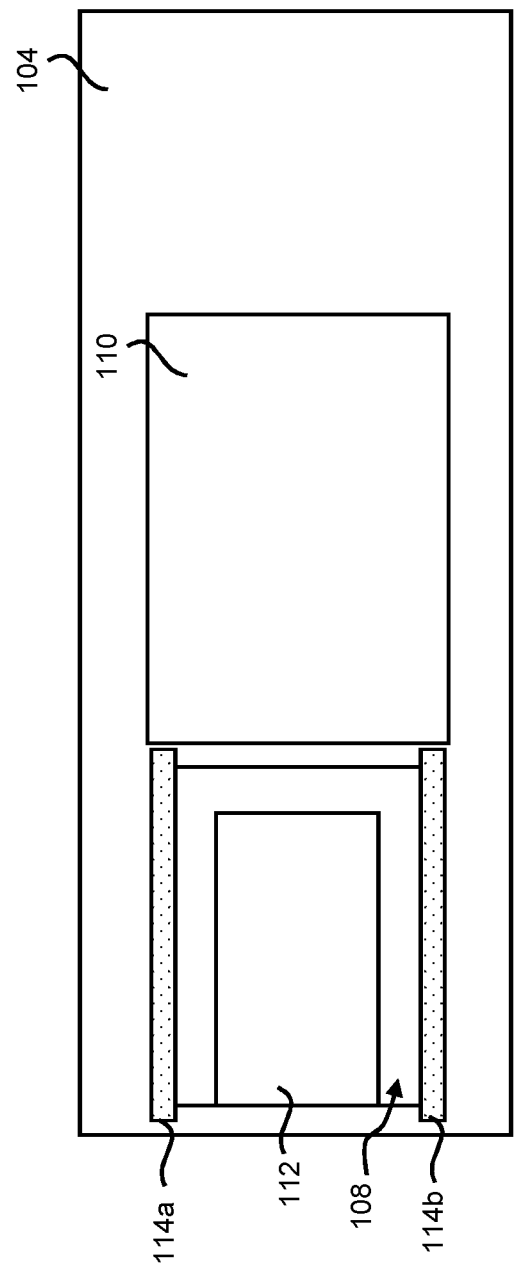

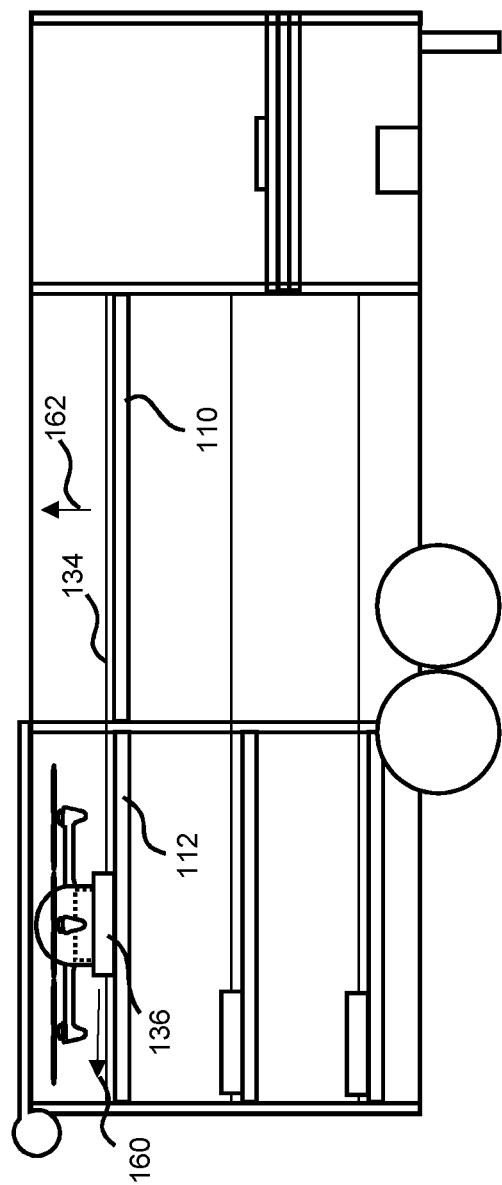

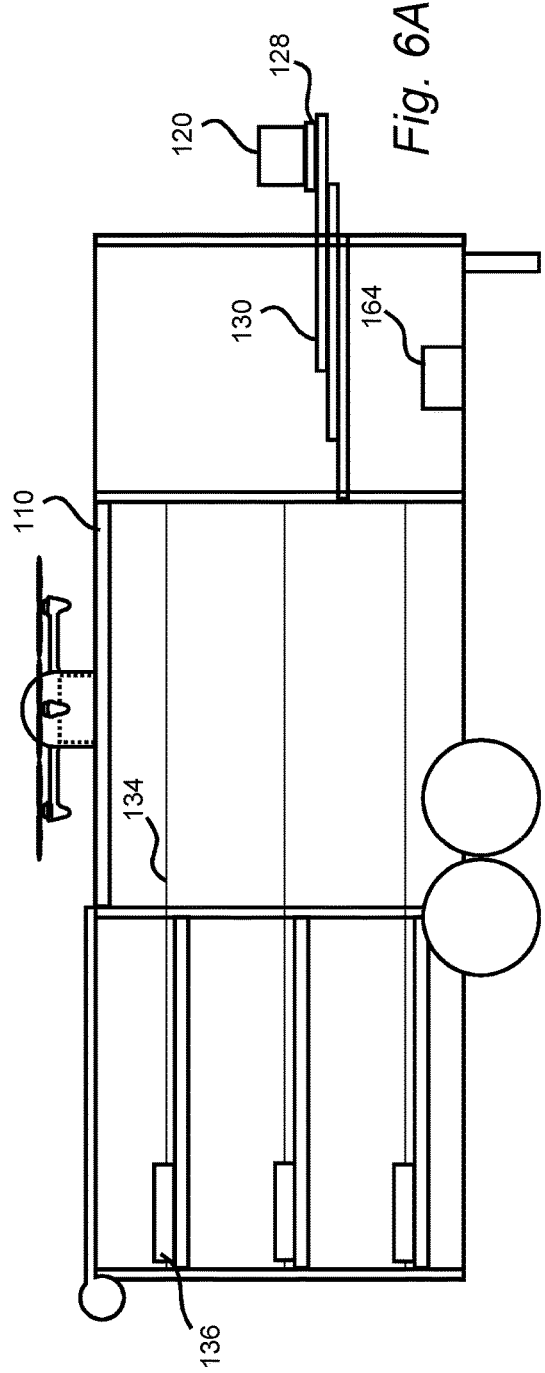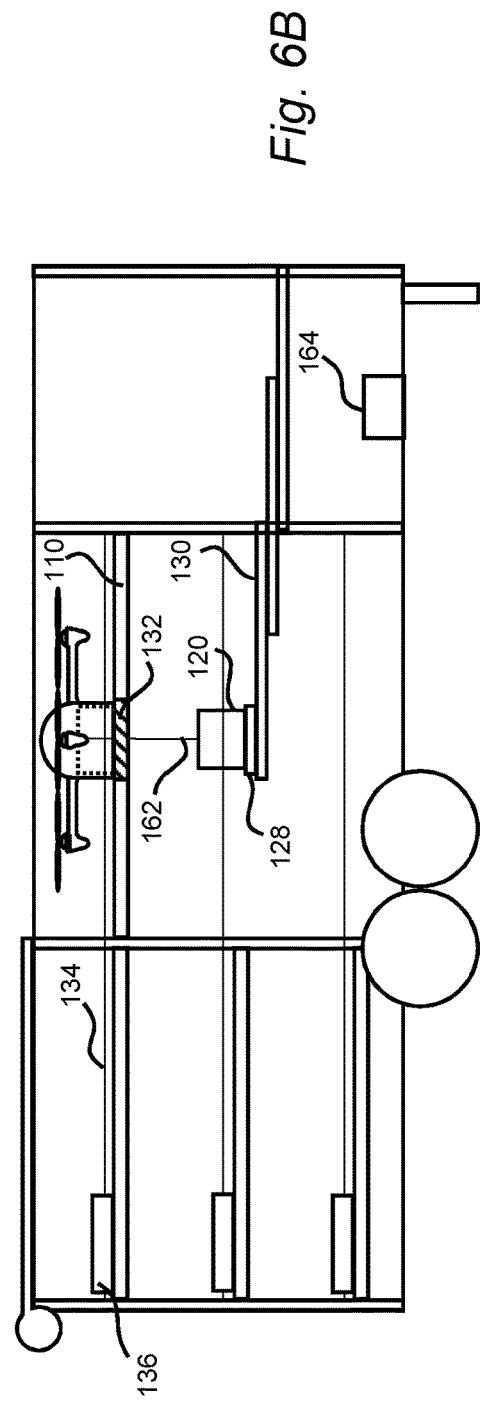

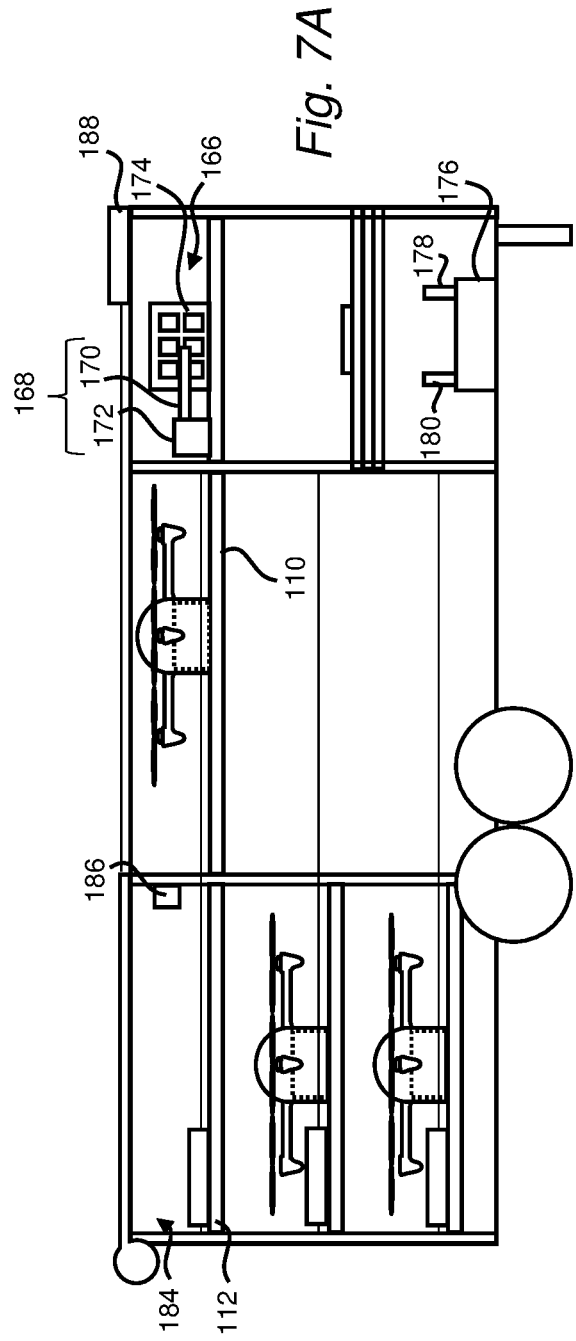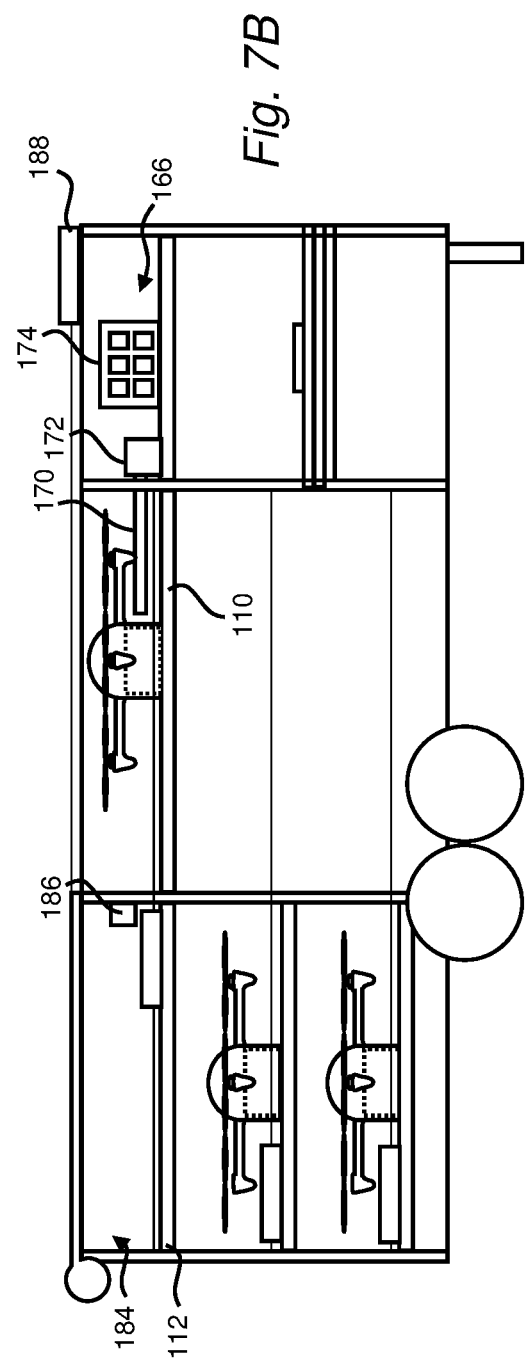

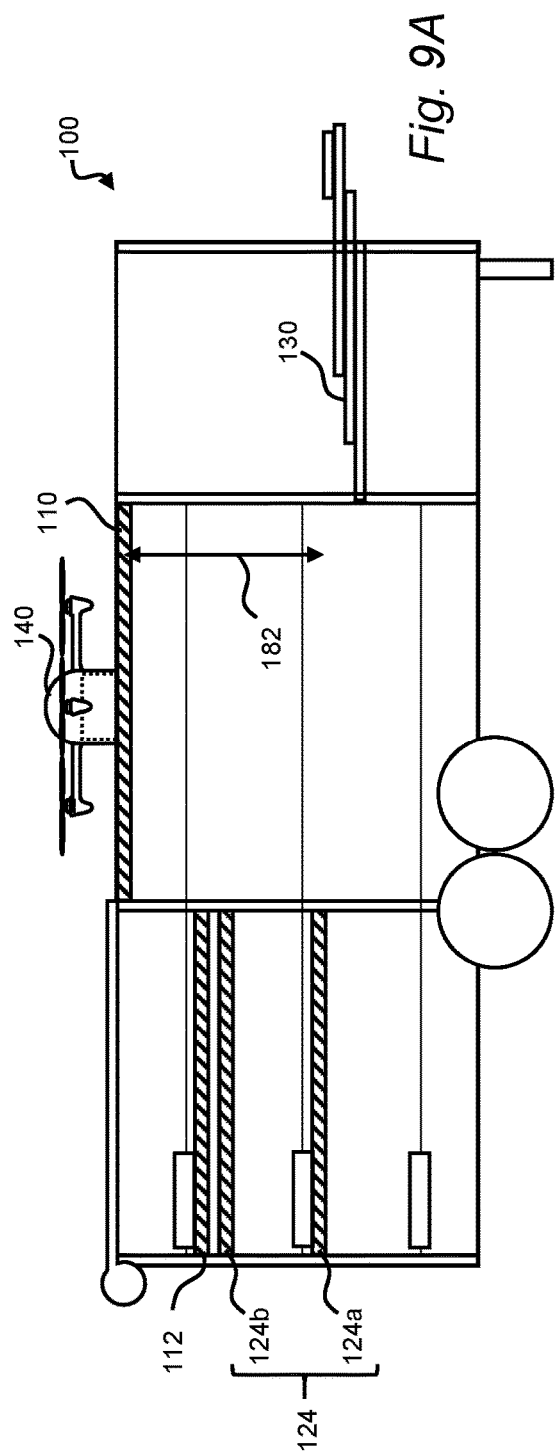
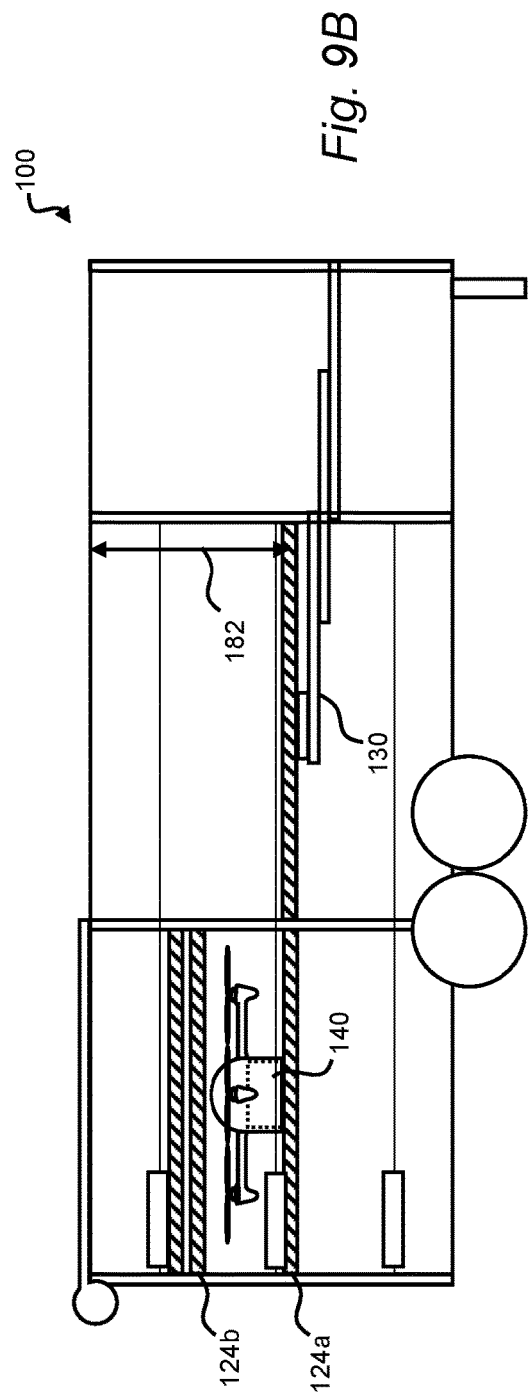

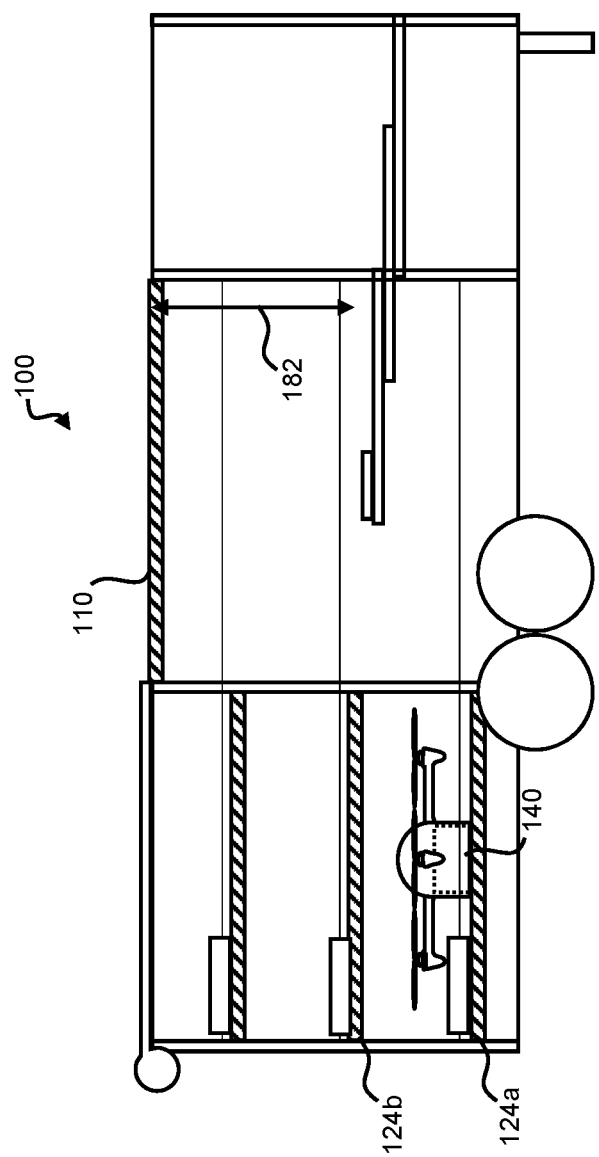

EMERGENCY UAV FACILITY

CROSS-REFERENCE TO RELATED APPLICATIONS

This application is a continuation of International Application No. PCT/US2019/051084, filed Sep. 13, 2019 which claims priority to U.S. Provisional Application 62/731,567, filed Sep. 14, 2018, under 35 U.S.C. § 119(a). Each of the above referenced patent applications is incorporated by reference in its entirety.

BACKGROUND OF THE INVENTION

Field of the Invention

The present disclosure relates to an unmanned aerial vehicle facility.

Description of the Related Technology

Delivery services offered by commercial carriers deliver goods to recipients. A typical delivery service maintains a large fleet of vehicles, including airplanes, trucks, and small vehicles. Airplanes and trucks move packages between mail sorting facilities, and smaller vehicles move the packages from the sorting facilities to delivery destinations such as homes or businesses. Such delivery services have some drawbacks and may not be efficient in catering to the needs of the consumers or businesses today. For example, such delivery services involve significant investment to procure and maintain the fleet of vehicles, and to manage the human resources required to operate the fleet. Another problem with such delivery services is that they may be incapable of delivering the goods in a short amount of time, such as in a few minutes or hours from the time the order is placed by the consumer. And even if these delivery services can deliver the goods in a short amount of time, it can be very expensive for the consumer.

In a similar way, emergency services also maintain a large fleet of emergency vehicles, including ambulances, smaller vehicles, motorbikes, and helicopters. These emergency services have some drawbacks and may not be as efficient as they could be to provide emergency support. For example, such emergency services are driven and operated by one or more humans, who may be unavailable at the time emergency care is needed. Further, these types of emergency vehicles are expensive to procure and operate, so are often in short supply. In addition, these types emergency vehicles can take a considerable amount of time to reach the scene of an accident, whether that be due to the time taken to prepare the vehicle for dispatch, or due to the time taken to navigate through traffic.

An unmanned aerial vehicle (UAV), such as a drone, can be utilized to transport packages that can include food, merchandise, or emergency supplies. Such a UAV delivery service can overcome some of the problems discussed above with respect to the conventional delivery and emergency services. However, these UAV delivery services can still have certain issues that affect the quality of service. For instance, UAV delivery services typically require UAV facilities within buildings, such as warehouses, which store packages for delivery. These facilities often require extensive modification, which is costly. Alternatively, humans may need to manually transport each package outdoors to provision the package to a UAV before takeoff. Such a manual provisioning process can be labor intensive, are subject to the vagaries of human behavior, and increase delivery time. Increased delivery time is particularly problematic if the payload being delivered contains medical supplies.

Accordingly, there is a need for an improved UAV facility which overcomes problems with existing UAV facilities.

SUMMARY

According to a first aspect of the present disclosure, there is provided an unmanned aerial vehicle (UAV) facility comprising a housing, a first moveable platform, a second moveable platform and a cover. An upper portion of the housing defines a surface for receiving a UAV, and the upper portion of the housing comprises a first opening and a second opening. The first moveable platform is movable to close the first opening such that the first moveable platform forms at least part of the surface. The second moveable platform is arranged adjacent to the first moveable platform and the cover is arranged above the second moveable platform to cover the second opening. The UAV facility further comprises a drive system configured to open and close the cover and to move the first and second platforms with respect to the upper portion of the housing, thereby to move a UAV through the first and second openings.

Such a UAV facility is particularly suitable to provide a UAV delivery service for medical supplies. As will be explained in more detail below, by reference to examples, the inclusion of the second moveable platform and cover allows for the quick launch of a UAV so that medical supplies or equipment can be delivered to the scene of an emergency most efficiently.

The example UAV facility can house one or more UAVs. For example, a first UAV can be stored within the housing, such as on one or more storage platforms/shelves. A second UAV can be stored on the second moveable platform. In a specific example, the first UAV is a standard UAV and the second UAV is an emergency UAV. A "standard UAV" is a UAV that is used to deliver non-medical supplies, such as food, or other goods. An "emergency UAV" is a UAV that can provide medical care to the scene of an emergency. For example, the emergency UAV may be a standard UAV but one which is carrying medical supplies or may be a UAV that is specially designed for emergency purposes and therefore comprises features that provide medical care. In some instances, a standard UAV can become an emergency UAV by loading the UAV with medical supplies. Medical supplies may include automated external defibrillators (AEDs) for example.

As mentioned, an emergency UAV may be stored within the housing, on top of the second moveable platform. The first platform may be unsuitable for storing a UAV because it forms part of the surface, also known as a landing surface. Instead of storing a UAV, the first platform acts as a roof or cover for the first opening. If a UAV was stored on the first platform it could be exposed to bad weather, vandalism, or other hazards. The second moveable platform does not act as a roof or cover. Instead, a separate cover covers the second opening. This means that a UAV can be stored on the second moveable platform inside the housing, while being be sheltered from e.g. the weather.

In an example, a standard UAV is stored within the housing, on a storage shelf, and an emergency UAV is stored on the second moveable platform. To launch the standard UAV so that it can deliver goods, the first platform must be lowered, so that the UAV can be moved from its storage location onto the first platform. Next, a payload is loaded into the UAV, and the first platform is raised again so that the UAV moves through the first opening and onto the upper portion of housing. From here, the UAV can take off. In contrast, to launch the emergency UAV, the cover can be opened and the second platform raised so that the UAV moves through the second opening and onto the upper portion of the housing. Once in this raised position, the second platform may form part of the surface. From here the UAV can take off. Such an emergency UAV may always be stocked with medical supplies, which reduces the need to load the UAV before launch. Such a UAV facility therefore allows an emergency UAV to be launched faster than a standard UAV because fewer steps are required to launch the emergency UAV. This is advantageous to provide a quick response in an emergency. In addition, by providing a separate launch platform for emergency UAVs and standard UAVs, the launch time can be further reduced by avoiding congestion that may occur if a single platform is used.

UAVs returning to the UAV facility can land upon the surface of the upper portion of the housing. For example, a UAV may land on a fixed/non-moveable portion of the surface, the first moveable platform, or the second moveable platform (if the second platform is raised and is not covered). Preferably, however, after the launch of a UAV from the second platform, the second platform is lowered into the housing and is re-covered. Therefore preferably, returning UAVs should land on the fixed portion of the surface or on the first platform. All returning UAVs can be positioned on the first platform, and be lowered, via the first platform, into the housing before being stored. If the returning UAV is a standard UAV, it may be moved from the first platform and onto a storage shelf. If the returning UAV is an emergency UAV, it may be moved from the first platform and onto the second platform ready for re-deployment. In certain scenarios however, a second emergency UAV may have already been moved onto the second platform. In that case, the returning emergency UAV can be replenished with medical supplies, if necessary, and be stored elsewhere within the housing.

In certain arrangements, the first opening and the second opening are separate openings. In other arrangements, they are parts of a single, larger opening such that the first platform closes part of the large opening and the cover covers at least the remaining part of the large opening. The cover may also be arranged to cover the first moveable platform.

The upper portion of the housing may be an upper surface of the housing. For example, a roof of the housing may provide the landing surface and may delimit the first and second openings.

The drive system may comprise a controller which controls/instructs the movement of the first and second platforms. The drive system may comprise one or more motors, or actuators, for example, which operate to move the platforms. The drive system may comprise a single drive mechanism to operate both the first and second platforms, or may comprise two separate mechanisms, each of which operates a platform.

"Moving the first and second platforms with respect to the upper portion of the housing" means either raising or lowering the platforms with respect to the landing surface.

In a specific example, the first platform is arranged towards the center of the upper portion/surface of housing, meaning that the adjacent second platform is arranged towards one end of the housing. As mentioned above, all types of returning UAV should aim to land on the first platform. The central location of the first platform on the housing therefore makes it easier and safer for a UAV to land on the surface because it is further away from the edges of the housing.

In some examples, the UAV facility is transportable, and may be suitable for outdoor use. For example, the housing may be mounted upon wheels so that it can be towed by a vehicle. Alternatively, the UAV facility may itself be a vehicle. The transportable UAV facility may be used by one or more businesses or individuals to house UAVs which deliver packages and medical supplies to recipients. Medical facilities, such as hospitals, may part-own the UAV facility with another business, such as a pizza restaurant. The pizza restaurant may use the UAV facility to deliver pizzas to customers, and the medical facility may use the UAV facility to deliver medical supplies. The medical facility and pizza restaurant may operate their own UAVs independently of each other.

By utilizing such a UAV facility, buildings need not be modified to accommodate UAVs. The UAV facility may be located near a business and/or a medical facility, such as on a driveway or in a car park. The housing may be stocked with items and upon receiving an order, the item may be automatically loaded onto a standard UAV before the UAV takes flight and delivers the item. Alternatively, items may be stocked in a nearby building, and upon receiving an order, a human, robot, vending machine or conveyor system can deposit the ordered item into an ingress/ingestion port on the housing from where it is automatically loaded onto a standard UAV.

Some example UAV facilities comprise a first UAV positioning mechanism configured to move an emergency UAV from the first moveable platform to the second moveable platform within the housing. Thus, as mentioned above, an emergency UAV for example, can be moved between the first moveable platform and the second moveable platform. A returning emergency UAV may enter the housing via the first platform, the first platform can be lowered to a height that is substantially equal to that of the second platform. The positioning mechanism can engage the emergency UAV and move it from the first platform to the second. The first platform can then be raised again.

As mentioned, some UAV facilities may also comprise one or more storage platforms/shelves to store a first UAV when the first UAV is not in use. The first UAV may be a standard UAV for example. Storage shelves provide means for improving the efficiency of the facility because additional UAVs can be utilized when other UAVs are in use. The storage platforms may also house different types or specifications of standard UAVs. For example, there may be different types of standard UAVs which can carry different weights or sized payloads. A specific standard UAV can then be selected depending upon the physical characteristics of the payload being delivered.

Preferably the storage platform is arranged below the second moveable platform. For example, one or more storage platforms may be stacked vertically below the second moveable platform. This configuration provides a more compact UAV facility because space beneath the second platform can be utilized. This design also simplifies operation of the facility. The first moveable platform can be configured to move to different heights within the housing so that standard or emergency UAVs can be collected from and deposited onto each storage platform.

Certain UAV facilities comprise a further/additional UAV positioning mechanism configured to move the first UAV between the storage platform and the first moveable platform. The housing may comprise a plurality of storage platforms, each storage platform comprising a further UAV positioning mechanism. Accordingly, there may be a further UAV positioning mechanism associated with each storage platform in addition to that associated with the second platform. This can simplify the mechanical operation of the facility because a single positioning mechanism is not required to move throughout the housing.

In certain examples, the storage platform(s) is/are fixed in position with respect to the housing. Accordingly, they are static, and do not move. Again, this simplifies operation of the facility. In other examples however, the storage platform(s) can move horizontally within the housing, such as towards and away from the first platform.

The positioning mechanism(s) may comprise one or more components, such as arms, members, motors, actuators and the like. The positioning mechanism may be generally fixed in place within the housing. Alternatively, the positioning mechanism may move within the housing. For example, the UAV positioning mechanism may comprise a guide rail and a moveable arm moveably mounted on the guide rail, wherein the moveable arm is configured to engage the UAV.

As mentioned above, the UAV facility comprises a cover to cover the second opening. In some examples, the cover is retractable. For example, it can slide or move to reveal or close the second opening. The cover may be formed from rigid materials, such as metal, plastic, wood, or the like. The cover may be articulated such that separate segments of the cover are moveable with respect to each other so that the cover can be folded, bent or rolled. The cover may alternatively be formed from flexible materials, such as cloth, fabric, flexible plastic or the like.

In a specific example the cover is arranged between, and is connected to, two guide rails so that the cover can be retracted and moved between a closed and open configuration. For example, the cover may be part of a cover mechanism which also comprises a first guide rail and a second guide rail spaced apart from the first guide rail, where the cover is moveably mounted between the first and second guide rails. The drive system is configured to open the cover by moving the cover along the first and second guide rails in a first direction such that the cover is retracted. The drive system is also configured to close the cover by moving the cover along the first and second guide rails in a second direction. This configuration provides a simple and effective mechanism to open and close the cover.

In a particular configuration, the cover mechanism further comprises a rotatable drum and one end of the cover is mounted/connected to the drum. Accordingly, the drive system is configured to open the cover by causing the drum to rotate, such that the cover is rolled onto the drum, and to close the cover by causing the drum to rotate, such that the cover is rolled off the drum. For example, the drum may rotate in a first angular direction to open the cover and the drum may rotate in an opposite, second angular direction to close the cover. Because the cover is connected to the drum, the cover can wrap around the drum as it rotates. The cover may be flexible for example. The use of a drum makes the cover mechanism more compact.

In a similar configuration, the cover comprises first and second portions, and the cover mechanism comprises a first rotatable drum and a second rotatable drum. The first portion of the cover is connected to the first drum such that the first portion is rolled onto the first drum, and the second portion of the cover is connected to the first drum such that the first portion is rolled onto the first drum. This means that the two drums can be made smaller than a single larger drum, to save space.

In some examples, the guide rails are straight such that they extend in one dimension. For example, the guide rails may be mounted on top of the housing.

In other examples the guide rails may extend in two dimensions, for example along the top of the housing and down one side of the housing. By extending in these two dimensions, the cover mechanism can be made more compact because it occupies less space on top of the housing. Accordingly, both the first and second guide rails extend at least partially along a side portion of the housing and at least partially along the upper portion of the housing.

In an alternative arrangement, the cover comprises a first portion and a second portion, and the drive system is configured to open and close the cover by moving the first and second portions with respect to each other. Accordingly, rather than having a single cover, two or more portions of the cover can be moved to open the cover. For example, the cover portions may open outwards or inwards like a book. Alternatively, the separate portions may move laterally, away from each other.

In a preferable embodiment of the UAV facility, the first moveable platform defines a first area and the second moveable platform defines a second area, where the first area is larger than the second area. Accordingly, the second moveable platform may be smaller than the first moveable platform. This is particularly advantageous because it is preferred that the second platform is only used to launch emergency UAVs. In contrast, the first platform is used to launch standard UAVs and to receive all types of landing UAVs. Because it can be difficult to accurately land a UAV, especially in certain weather conditions, a larger first platform is useful to receive the landing UAVs. The second platform can be smaller in dimension because UAVs do not need to land on this platform. This therefore saves space.

To further increase the "time to launch" of emergency UAVs located on the second platform, the drive system may be configured to move the first platform at a first speed and move the second platform at a second speed, where the second speed is greater than the first speed. The drive system may therefore comprise specific motors, actuators or other components capable of moving the second platform at a faster speed to ensure that an emergency UAV can be quickly launched. Often these components are more expensive, larger, heavier, or more complex to operate and maintain, so it may be desirable to use these components only for raising and lowering the second platform.

All types of UAV returning to the UAV facility may need to undergo maintenance. For example, they may need to be re-charged, undergo a battery swap procedure, or to undergo repairs. Accordingly, some example facilities comprise a maintenance system arranged adjacent to the first moveable platform, wherein the maintenance system comprises a maintenance mechanism arranged to perform maintenance on a UAV located on the first moveable platform. By locating the maintenance system next to the first platform, UAVs of all types can undergo maintenance as they return to the housing via the first platform. After any maintenance has been performed, the UAV may be stored.

The maintenance mechanism may comprise one or more moveable members configured to interact with the UAV while the UAV is positioned on the first platform. For example, the maintenance mechanism may comprise a robotic arm connected to a mount, where the mount is fixed in position with respect to the housing, and the robotic arm is configured to extend into a region/volume above the first moveable platform. The maintenance mechanism may therefore be a robot.

By using a robotic arm, such as a three-axis robotic arm, that is fixed in position upon a mount (i.e. it does not move around within the housing), the operation of the maintenance mechanism can be simplified while saving space within the housing. For example, the robot need not travel within the housing. A three-axis robotic arm provides good maneuverability in a small space.

In some examples, the maintenance system is arranged on a first side of the first moveable platform and the second moveable platform is arranged on a second side of the first moveable platform, the second side being opposite to the first side. Accordingly, the three different regions within the housing are arranged in a line, such as along a longitudinal axis of the UAV facility. For example, a front region of the housing may house the second platform, the center region may house the first platform, and the rear region may house the maintenance system. This arrangement can keep the width of the housing narrow, which is particularly advantageous when the facility is moveable, to reduce aerodynamic drag. By positioning the maintenance system at one end of the housing, individuals can more easily access the maintenance system to replenish items, such as spare batteries.

In one particular example, the maintenance system comprises a battery storage facility configured to re-charge removable UAV batteries. The robotic arm is therefore configured to extend into the region above the first platform to remove a battery from the UAV, position the battery in the battery storage facility; remove a charged battery from the battery storage facility, and extend into the region to position the charged battery in the UAV. Accordingly, the robotic arm can remove batteries that are partially or fully depleted and replace them with re-charged batteries. The robotic arm may be configured to replace UAV batteries when the UAV returns to the facility. The first platform may therefore be lowered to a particular height so that the battery can be replaced.

In some examples, the maintenance system comprises a holding mechanism configured to engage the UAV while it is located on the first platform and while it is undergoing a battery replacement procedure. Such a holding mechanism stops the UAV from being accidentally moved by the action of removing and replacing a battery.

In one arrangement, the drive system is configured to move the first moveable platform to a first position that is adjacent to, and level with, the second moveable platform, and the maintenance mechanism is configured to perform maintenance on the UAV located on the first moveable platform when the first moveable platform is positioned at the first position. Accordingly, the first and second platforms are arranged at the same height when the emergency or standard UAV is undergoing maintenance. In the case of an emergency UAV, this avoids lowering the first platform to a low height position, then raising the first platform back up to a higher position to deposit the emergency UAV on the second platform. It is therefore more efficient and less time consuming to perform maintenance on all types of UAV when they are located at a height equal to the second platform. This can mean that an emergency UAV is repositioned on the second platform faster.

The maintenance system may also be configured to perform pre-flight and/or post-flight checks on the UAV. A pre-flight check may include determining that the UAV is safe to fly. For example, the maintenance system may comprise an imaging device configured to capture an image and/or video of the UAV before takeoff. The maintenance system may also comprise an image recognition system configured to determine, based on the captured image/video whether the UAV is damaged. If it is determined that the UAV is damaged, the maintenance system may cause a user (such as a member of a maintenance team) to be notified that the UAV is damaged. The maintenance system may also cause the flight to be aborted. A similar post-flight check may also be performed.

In certain UAV facilities, the housing comprises a payload positioning mechanism/system configured to move a payload between an initial position and a loading position, wherein the loading position is arranged below the first platform and the payload is engageable by all types of UAV located on the first platform when the payload is at the loading position. Accordingly, a UAV can be positioned on the first moveable platform and from here can engage the payload so that the payload can be loaded onto the UAV before it is delivered. The payload positioning mechanism moves the payload from an ingress port or payload storage area, for example, to a position below the first platform. In this position, the UAV can take hold of the payload. For example, the UAV may comprise a retractable tether comprising a coupling mechanism at one end. The coupling mechanism may engage a corresponding engagement mechanism on the payload. As the UAV retracts the tether, the payload may be lifted towards the UAV, and may be stored within a compartment during flight. In a specific example, the first platform delimits an aperture through which the payload can pass. The UAV can extend the tether through the aperture to engage the payload located below. An emergency UAV may receive a medical payload when it returns to the UAV facility because the previous payload has been depleted. The emergency UAV may therefore be stored on the second platform with the medical payload already located within the UAV. In contrast, a standard UAV may be stored on a storage platform and only receive a payload before it takes off. In one example, the payload storage area stores one or more AEDs which can be loaded onto an emergency UAV.

In examples where the facility comprises a first positioning mechanism to move the emergency UAV from the first platform to the second platform, the payload positioning mechanism may be configured to determine that the UAV located on the first platform is an emergency UAV configured for dispatch in the event of an emergency, and responsively, move a new payload from the initial position to the loading position before the first UAV positioning mechanism moves the emergency UAV from the first moveable platform to the second moveable platform.

The new payload may comprise medical supplies, for example. This arrangement is particularly advantageous in scenarios where the emergency UAV is returning to the facility having attended the scene of an emergency. Some or all of the medical supplies within the UAV may have been used during the emergency. Accordingly, if it is detected that the returning UAV is an emergency UAV, a new payload can be loaded onto the UAV before it is moved onto the second platform for storage. This ensures that the emergency UAV is always equipped with medical supplies.

"Determining that the UAV is an emergency UAV" may comprise receiving a signal from the UAV. For example, the signal may identify that the UAV is an emergency UAV, or may identify that the standard UAV is to become an emergency UAV. In another example, a scanner may scan a machine-readable code located on the UAV to determine whether the UAV is an emergency UAV. In some examples, the new payload is only moved from the initial position to the loading position if it is further determined that that a previous payload has been used/depleted. Again, this may be determined by receiving a signal from the UAV which indicates that supplies were used during the emergency. Alternatively, the UAV may be weighed to determine whether any supplies have been removed from the UAV.

As mentioned above, an emergency UAV may be stored on the second platform and be pre-loaded with a payload comprising medical supplies. Certain medical supplies are required to be maintained at certain conditions. For example, they may need to be kept below a certain temperature, or below a certain humidity level. Accordingly, the second moveable platform may be located within an enclosure, where the enclosure comprises at least one sensor configured to measure environmental conditions within the enclosure. Based on data measured by the sensor, the facility may alter the environmental conditions to ensure that the medical supplies remain within suitable environment conditions. Alternatively, the facility may not have the capability to alter the conditions, but may transmit or generate an alert to notify an individual that the environmental conditions are insufficient for the storage of the medical supplies.

In some examples, the UAV facility comprises a second UAV positioning mechanism arranged on the upper portion of the housing, wherein the second UAV positioning mechanism is configured to move a UAV from a first position on the surface to a second position on the first moveable platform. Accordingly, this second UAV positioning mechanism can position all types of UAV on the first moveable platform. For example, a UAV may land on the surface of the housing, and may require re-positioning so that it can be moved within the housing.

Some of the example UAV facilities may further comprise a communications system having a first transceiver configured to communicate with an electronic commerce facility and a second transceiver configured to communicate with an emergency dispatch facility.

The second transceiver may communicate using specific frequency channels used by emergency services for example or may communicate using a power level above that of the first transceiver to ensure good connectivity. These higher powers/frequencies may be reserved for emergency services only.

Further features and advantages of the disclosure will become apparent from the following description of preferred embodiments of the disclosure, given by way of example only, which is made with reference to the accompanying drawings.

BRIEF DESCRIPTION OF THE DRAWINGS

FIG. 3A is a side view of another UAV facility in accordance with another example;

FIG. 3B is plan view of the UAV facility of FIG. 3A;

FIGS. 4A and 4B are plan views of another UAV facility in accordance with a further example;

FIGS. 5A-5C are side views of a UAV facility comprising a UAV positioning mechanism in accordance with an example;

FIGS. 6A and 6B are side views of a UAV facility comprising a payload positioning mechanism in accordance with an example;

FIGS. 7A and 7B are side views of a UAV facility comprising a maintenance system in accordance with an example;

FIGS. 9A-9C are side views of a UAV facility comprising moveable storage platforms in accordance with an example.

DETAILED DESCRIPTION OF CERTAIN INVENTIVE EMBODIMENTS

Disclosed are example UAV facilities. A UAV facility is a unit which can house one or more UAVs, store packages, provide a landing surface, or act as a UAV battery charging/replacement unit.

Figure 1A:
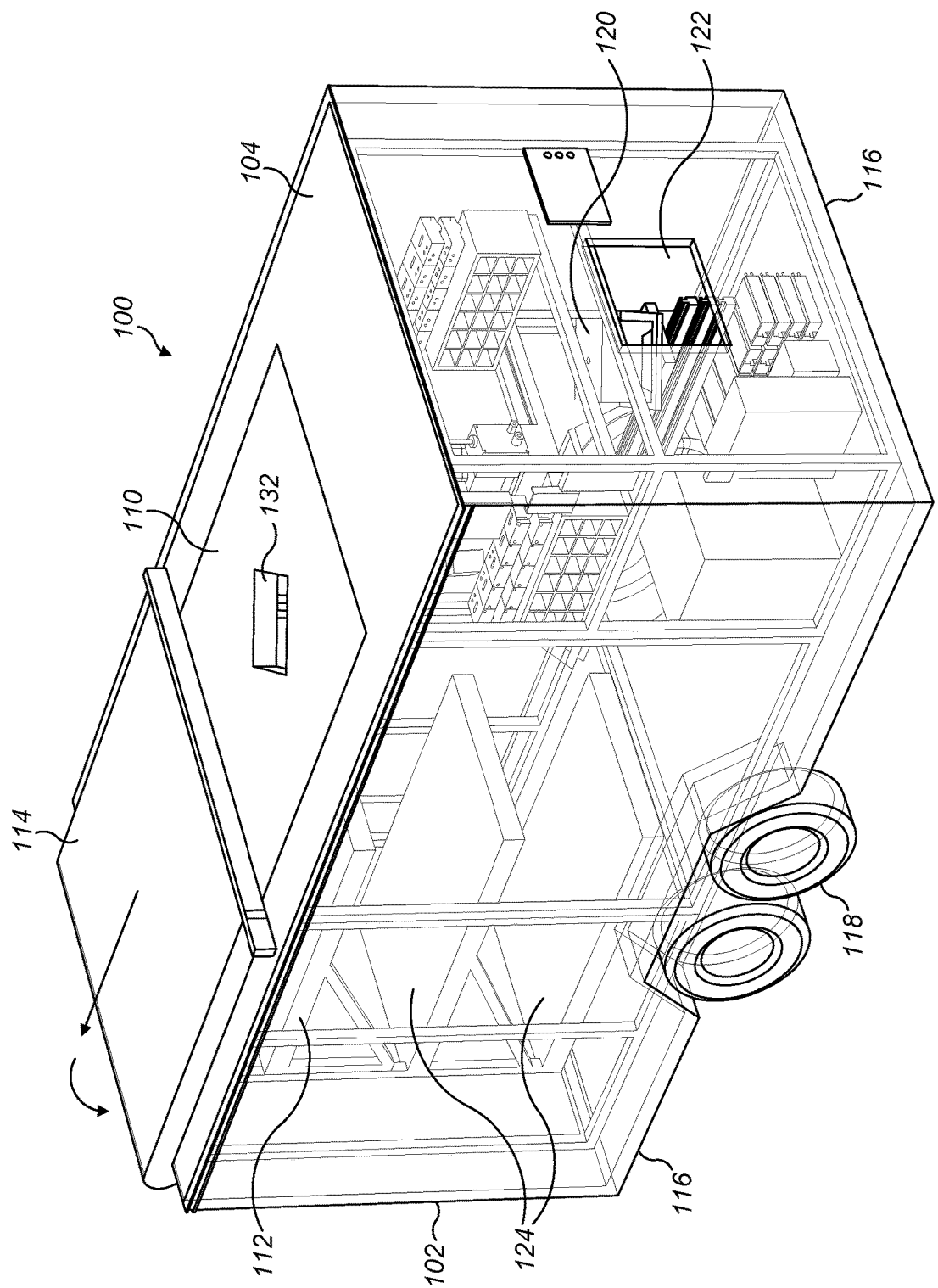
FIGS. 1A-1D are perspective views of an unmanned aerial vehicle facility in accordance with an example.

FIG. 1A depicts an example UAV facility 100 that is suitable for use by an emergency UAV and other types of UAV. The facility 100 comprises a housing 102, and an upper portion/surface of the housing defines a surface 104 for receiving a UAV. For example, a UAV may fly above the facility 100 and land on the surface 104. The upper portion of the housing 102 comprises a first opening 106 (visible in FIG. 1D) and a second opening 108 (visible in FIG. 1B). In FIG. 1A the first opening 106 is covered by a cover 114 and the second opening 108 is closed by a first moveable platform 110. In a preferred example, a UAV can enter and exit the housing 102 via the first opening 106, and the second opening 108 is used as an exit only.

The facility 100 comprises the first moveable platform 110, which is movable to close or open the first opening 106. FIG. 1A depicts the first platform 110 in a raised position so that it forms at least part of the surface 104. The facility 100 further comprises a second moveable platform 112 that is moveable adjacent to the first moveable platform 110. The cover 114 is arranged above the second moveable platform 112 to cover the second opening 108. FIG. 1A shows the cover 114 in a closed position, which obscures the second opening 108. The cover 114 therefore extends over the second opening 108 to stop rain, snow, animals or individuals from entering the housing 102 via the second opening 108. The first platform 110 itself acts as a cover to stop rain, snow, animals or individuals from entering the housing 102 via the first opening 106. UAVs can be moved through the first and second openings 106, 108 by the first and second moveable platforms 110, 112.

The facility 100 further comprises a drive system (not shown) configured to open and close the cover 114 and to move the first 110 and second platforms 112 with respect to the upper portion of the housing 102. The drive system may comprise one or more separate mechanisms to operate the cover 114 and the platforms 110, 112.

The housing 102 comprises a number of side panels 116. In this example there are four vertically orientated side panels/surfaces, as well as a base, and the upper surface 104. In this example, the housing 102 is mounted or attached to a number of wheels 118 so that the facility 100 may be transported. As mentioned previously, the facility 100 may be towed by a vehicle, or it may be a vehicle itself.

The housing 102 defines a volume within which payloads 120, UAVs, batteries, and/or other objects can be stored. A payload 120 may be received within the housing 102 via one or more ingress ports 122 (which may be closeable). Once loaded into the housing 102, the payloads may be moved to a particular location within the housing 102 before being loaded onto a UAV.

FIG. 1A also depicts UAV two storage platforms 124 to store a UAV when the UAV is not in use. The storage platforms 124 in this example are located below the second platform 112 and are fixed in position within the housing 102

Figure 1B:
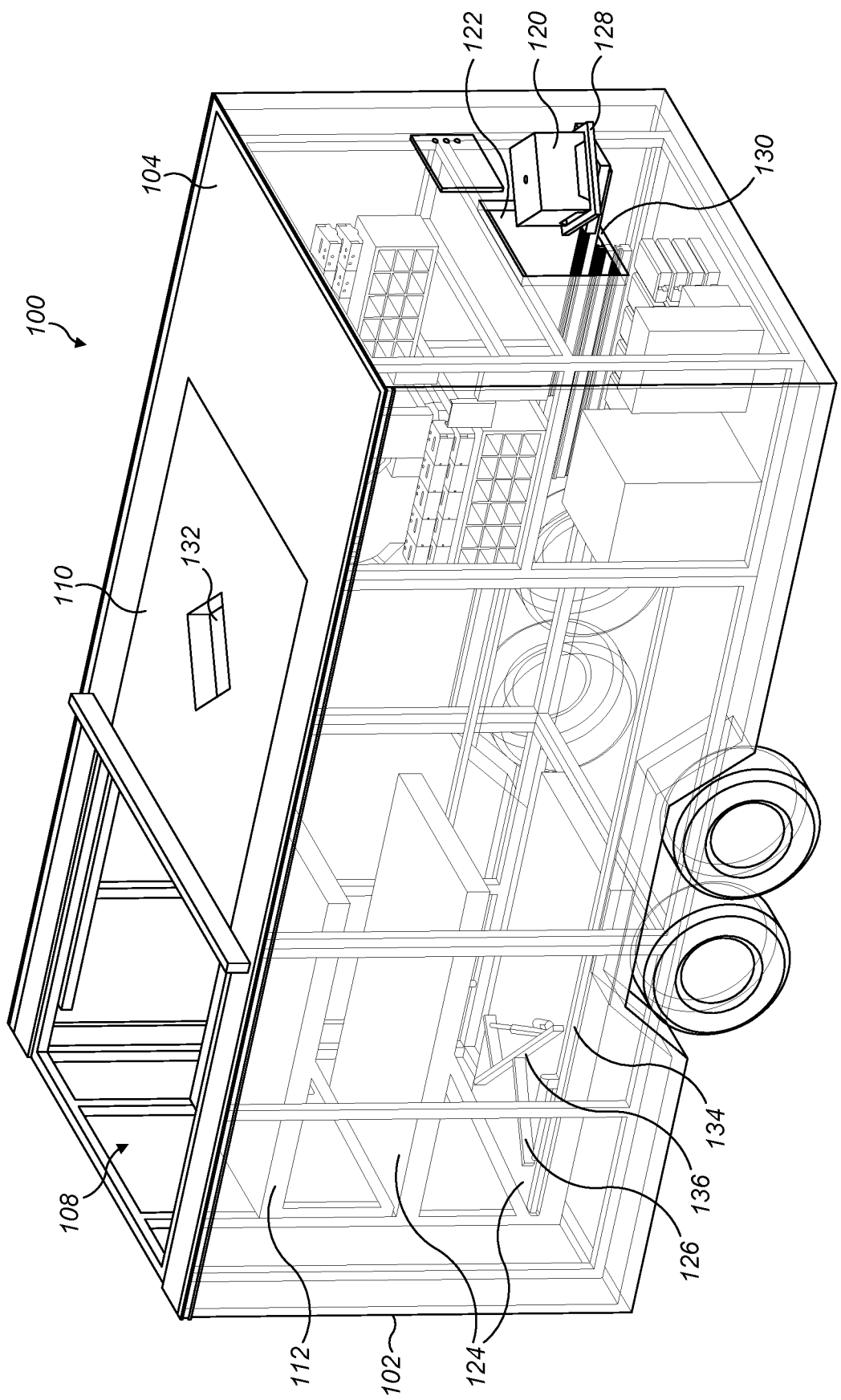

(i.e. they do not move). Each storage platform 124 may be associated with a UAV positioning mechanism 126 (one of which is depicted in FIG. 1B). These positioning mechanisms 126 can be used to move a UAV between the first platform 110 and a storage platform 124. The second platform 112 may also be associated with a UAV positioning mechanism (described in relations to FIGS. 5A-5C) which can be used to move an emergency UAV between the first platform 110 and the second platform 112. In some examples a single UAV positioning mechanism is used to move UAVs between the various platforms.

As mentioned, this example UAV facility 100 is particularly suitable for deploying and/or storing two types of UAV; a standard UAV used to deliver goods, and an emergency UAV used to deliver medical supplies to the scene of an emergency. The UAV facility can therefore be implemented in a variety of situations. In a first example situation, customer orders an item, such as a pizza, from an online business. The customer requests delivery to a particular address. Upon receiving the order, the business prepares the item for delivery. Once prepared, an employee can take the item to a nearby UAV facility. Using a user terminal, for example, the employee indicates that they wish for a standard UAV to deliver the item. The standard UAV is currently located on a storage platform within the UAV facility. Upon receiving the input from the employee, an ingress port opens, and the employee deposits the item into the housing of the UAV facility. Simultaneously, the first platform 110 moves to the storage platform and the standard UAV is moved onto the first platform. A payload positioning mechanism within the housing moves the item into a position so that it can be loaded onto the standard UAV. For example, the item is arranged below the first moveable platform 110 so that the standard UAV, arranged on top of the first platform 110, can engage the item. Once received within the standard UAV, the first platform 110 is raised so that the UAV can take off and deliver the item to the customer.

In a second example situation, an individual witnesses a car crash and dials an emergency telephone number to request that an ambulance is dispatched to the scene of the accident. The call is received by an employee of an emergency dispatch facility who dispatches an ambulance. Simultaneously, the employee requests the services of an emergency UAV. The emergency UAV can provide some emergency supplies, such as bandages and a warm blanket, until the ambulance arrives. The emergency UAV may also carry an AED for example. The emergency UAV may also record video, so that the ambulance paramedics can assess the accident before they arrive. The UAV facility receives an urgent request for an emergency UAV. The emergency UAV is already on the second platform 112 and is pre-loaded with medical supplies. Upon receiving the request, the UAV facility causes the cover 114 to be opened, the second platform 112 to be raised, and the emergency UAV takes off and navigates to the scene of the accident.

The above described UAV facility therefore allows an emergency UAV to be dispatched as quickly as possible in cases of emergency. In particular, the second platform can be used to store an emergency UAV so that it can be dispatched quickly.

FIG. 1B depicts the UAV facility 100 with the cover 114 omitted to reveal the second opening 108. A payload 120 is also depicted outside of the ingress port 122, where it is positioned upon a tray 128 at one end of a retractable arm 130. The arm 130 and tray 128 together form a payload positioning mechanism which moves the payload 120 from an initial position (such as that shown in FIGS. 1B and 6A) to a loading position below the first platform 110 (such as that shown in FIG. 6B). In this example, the first moveable platform 110 delimits an aperture 132 through which to receive the payload 120 when the payload 120 is in the loading position. For example, a standard (which is to say, non-emergency) UAV located on the first platform 110 may lower a coupling mechanism, attached to one end of a tether, through the aperture 132 to engage the payload 120. Once received within a compartment of the standard UAV, the first platform 110 may be raised to allow the standard UAV to take flight and deliver the payload 120 to a destination. In certain examples the aperture 132 is closeable by one or more movable members. In a similar way, a returning emergency UAV can be received within a compartment of the emergency UAV before the UAV is stored on the second platform 112.

As mentioned above, the lower storage platform 124 comprises a UAV positioning mechanism 126. Each storage platform 124 may be associated with its own UAV positioning mechanism. The positioning mechanism of this example comprises a guide rail 134 and a moveable arm 136 which is moveable along the guide rail 134. When the first platform 110 is lowered to a height that is substantially level with the storage platform 124, the moveable arm 136 can move between the storage platform 124 and the first platform 110. The guide rail 134 therefore extends from the storage platform 126 to the first platform 110. Thus, the moveable arm 136 can move towards a standard UAV located on the first platform 110, engage the UAV, and move back towards the storage platform 124 to move the UAV onto the storage platform 124. In some situations, additional emergency UAVs can be stored on the storage platforms 124.

Figure 1C:
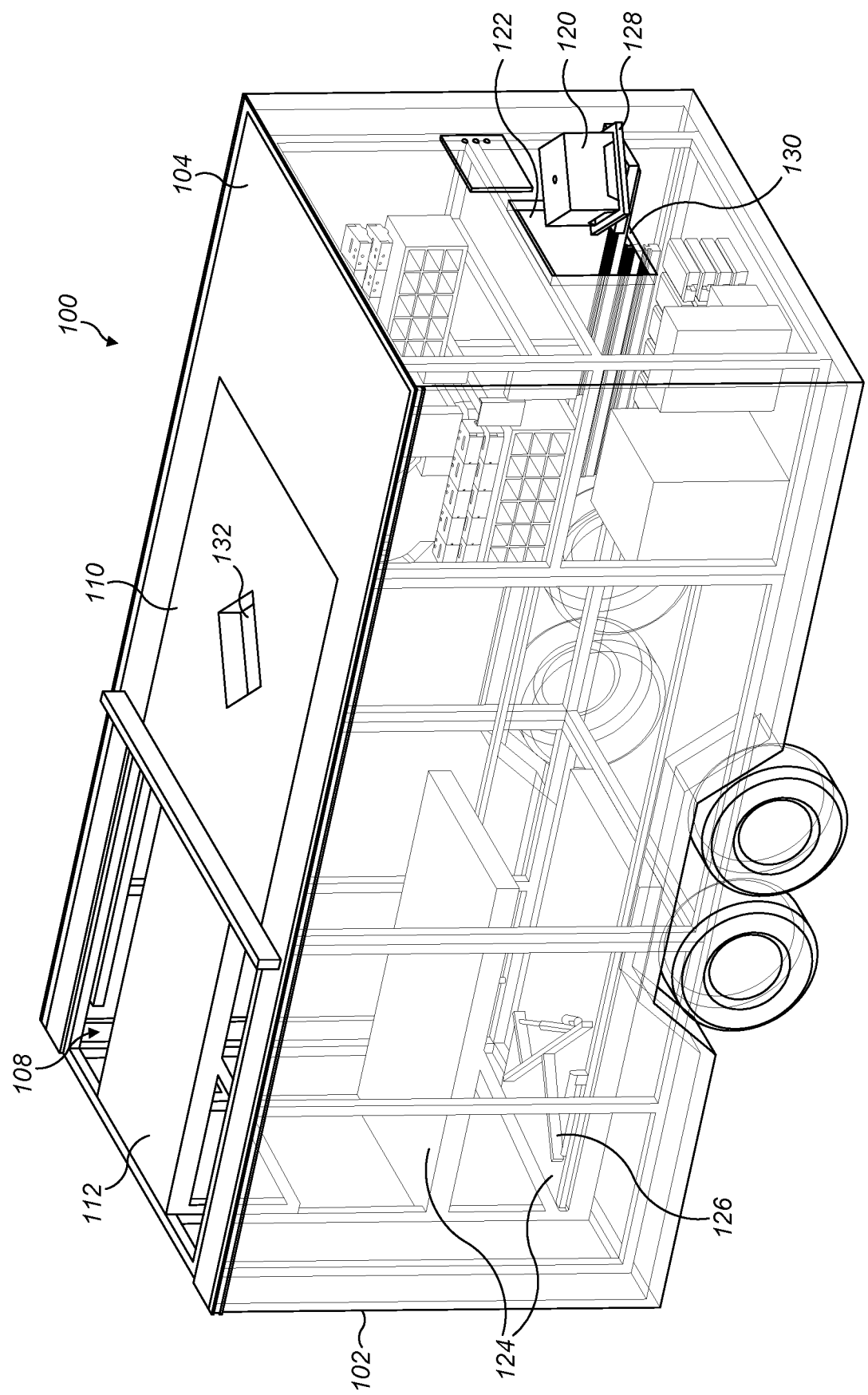

FIG. 1C depicts the UAV facility 100 of FIG. 1B with the second platform 112 in a raised position. The drive system operates to move the second platform 112 from the position shown in FIG. 1B to that shown in FIG. 1C. In this raised position, the second platform 112 is coplanar with the surface 104 and the first platform 110 which is also in a raised position. As is clear in FIG. 1C, the first platform 110 defines an area that is larger than an area defined by the second platform 112.

In an example, an emergency UAV is located on the second platform 112, and is moved up through the second opening 108 so that it can take off to deliver medical supplies or to provide emergency care. Once the emergency UAV has taken off, the drive system can lower the second platform 112 from the position shown in FIG. 1C to that shown in FIG. 1B. The drive system can then re-cover the second opening 108.

Figure 1D:
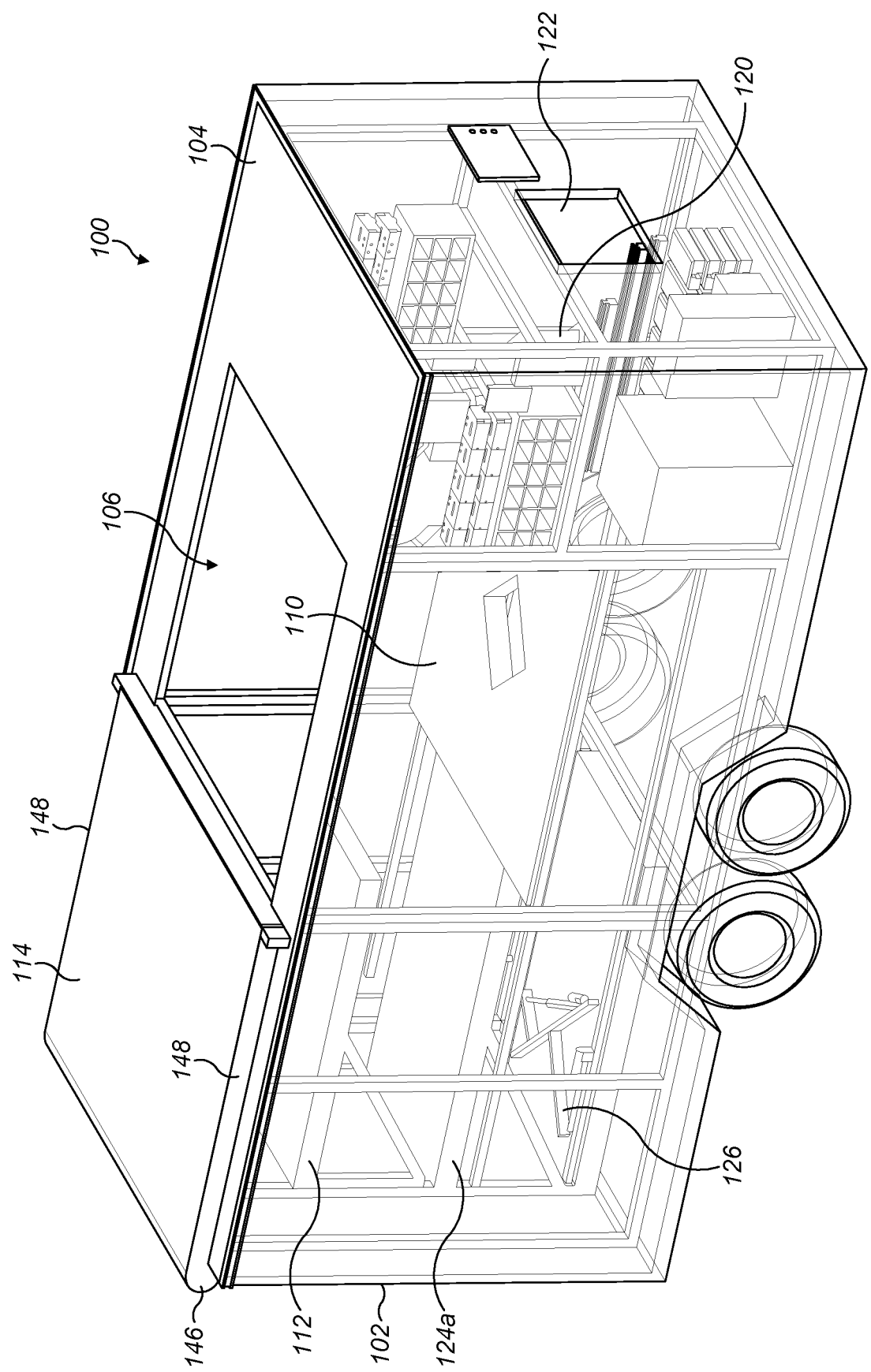

FIG. 1D depicts the UAV facility 100 with the first platform 110 in a lowered position and the cover 114 in place to cover the second opening 108. The drive system operates to move the first platform 110 from the position shown in FIG. 1C to that shown in FIG. 1D. In this lowered position, the first platform 110 is no longer coplanar with the surface 104.

In an example, a standard UAV may have landed on the surface 104 and be located on the first platform 110. By operating the first platform 110, the standard UAV can be moved into the housing 102 via the first opening 106. The UAV may be moved into the housing 102 to collect the payload 120, or, as in this example, be moved into the housing 102 for storage on the first storage platform 124a. In the latter case, the drive system operates to move the first platform 110 to a height that is substantially equal to that of the first storage platform 124a. A UAV positioning mechanism (not shown), that is associated with the first storage platform 124a, may engage the UAV to move the UAV from the first platform 110 onto the first storage platform 124a. The drive system can then move the first platform 110, which now no longer has a standard UAV thereon, back to the raised position ready to receive another UAV.

In a particular example, the drive system is configured to move the second platform 112 at a speed that is faster than that of the first platform 110. This allows the second platform 112 to be raised quicker in cases of emergency.

Figure 2A:
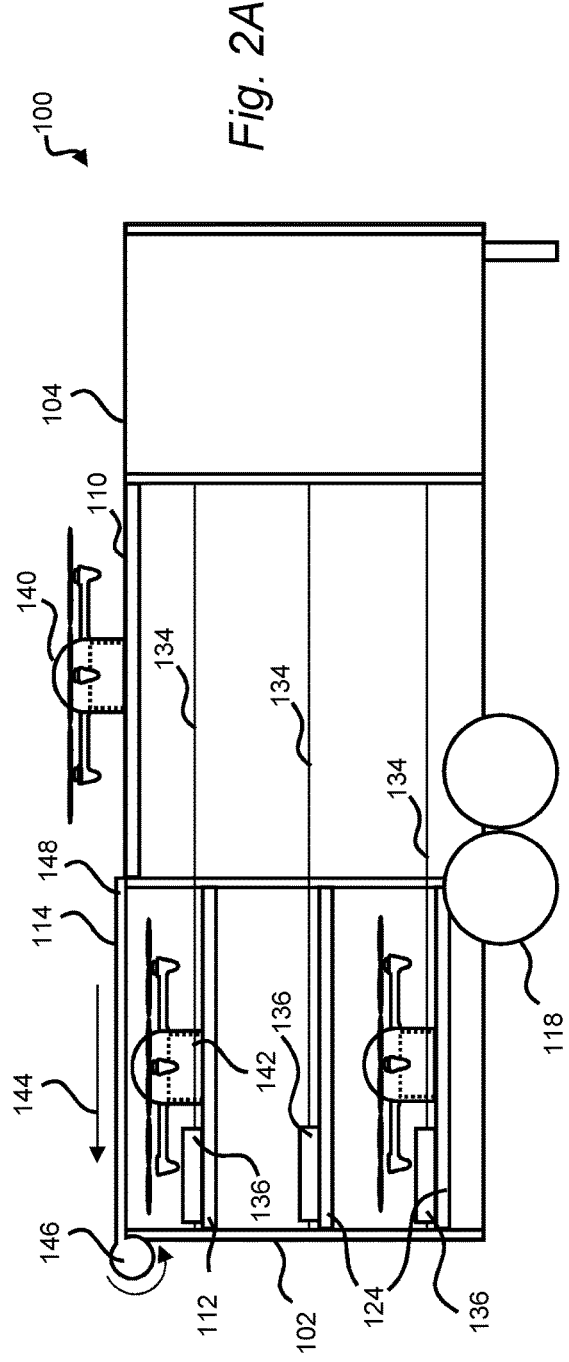
FIGS. 2A and 2B are side views of a UAV facility in accordance with another example.

FIG. 2A depicts a simplified diagram of an example UAV facility 100. In this example, there are a plurality of UAV positioning mechanisms; one associated with the second platform 112 and one associated with each of the two storage platforms 124. Each UAV positioning mechanism comprises a guide rail 134 and a moveable arm 136. FIG. 2A depicts a standard UAV 140 located on the first platform 110, and an emergency UAV 142 located on the second platform 112. A further standard or emergency UAV is stored on the lower storage platform.

FIG. 2A also depicts a cover mechanism comprising the cover 114 and two guide rails 148 (most clearly depicted in FIG. 1D). In this example, the cover 114 is arranged in a closed position from where it can be retracted into an open position. The cover 114 extends between the two guide rails 148 and can be moved along the guide rails 148 in a first direction (indicated by arrow 144) to reveal the second opening 108. Similarly, the cover 114 can be moved along the guide rails 148 in a second direction (opposite to that indicated by arrow 144) to close the second opening 108. The two guide rails 148 extend in one dimension along the upper portion of the housing 102. This particular cover mechanism also comprises a drum 146 around which the cover 114 can be rolled. The drive system can cause the drum 146 to rotate such that the cover 114 is wrapped around the drum 146 to open the cover 114. Similarly, the drive system can cause the drum 146 to rotate in the opposite direction such that the cover 114 is rolled off the drum 146 to close the cover 114.

Figure 2B:
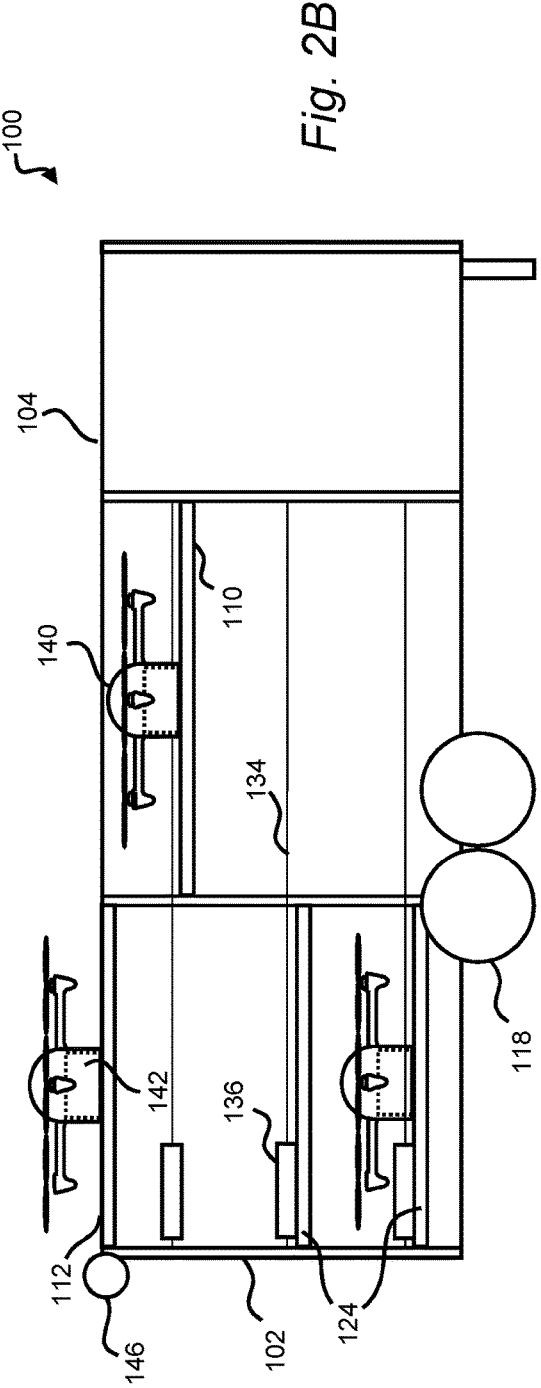

FIG. 2B depicts the UAV facility 100 of FIG. 2A at a later time. Here the drive system has caused the cover 114 to be opened and be wrapped around the drum 146. The drive system has also caused the first platform 110 to be lowered and has caused the second platform 112 to be raised to launch the emergency UAV 142. From these positions, the emergency UAV 142 can take flight and the standard UAV 112 can either be stored on an available storage platform 124 or can collect a payload. The drive system can operate the first platform 110, the second platform 112 and the cover 114 interpedently of each other. Accordingly these actions can occur separately, at any time, and in any order.

In some examples the drum 146 is omitted, and the drive system causes the cover 114 to move along the guide rails 148 without wrapping the cover 114 around a drum. For example, the cover 114 may translate from a first, closed position to a second, open position. In another example, the cover 114 is caused to be compressed into a concertina shape at one end of the guide rails as it moves into the open position.

FIGS. 3A and 3B depict an alternative cover mechanism that does not include a drum. FIG. 3A depicts a side view of the UAV facility 100 and FIG. 3B depicts a top-down view of the facility 100. In this example, the cover 114 is located in a closed position. The cover 114 extends between the two guide rails 150 and can be moved along the guide rails 150 in a first direction (indicated by arrow 144) to reveal the second opening 108. Similarly, the cover 114 can be moved along the guide rails 150 in a second direction (opposite to that indicated by arrow 144) to close the second opening 108. In this example, the guide rails 150 extend in two dimensions, such that both guide rails 150 extend partially along the upper surface of the housing 102 and at least partially along the rear side portion 116 of the housing 102. The drive system can cause the cover 114 to move along the guide rails 150 such that the cover retracts across the top of the housing 102 and down the rear side of the housing 102 to open the cover 114.

FIGS. 4A and 4B depict another cover mechanism. In this example, the cover 114 comprises a first portion 114a and a second portion 114b. The first and second portions 114a, 114b can be moved with respect to each other to open and close the opening 108.

FIG. 4A depicts a depicts a top-down view of the facility 100 with the cover 114 in a closed configuration. FIG. 4B depicts a depicts a top-down view of the facility 100 with the cover 114 in an open configuration. The drive system can cause the first portion 114a to rotate away from the opening 108 in the direction of the arrow 152a. Similarly, the drive system can cause the second portion 114b to rotate away from the opening 108 in the direction of the arrow 152b. In another example, the first and second portions 114a, 114b can rotate into the opening 108 to move from the closed configuration to the open configuration. FIG. 4B shows the second platform 112 located within the housing 102.

Figure 5A:
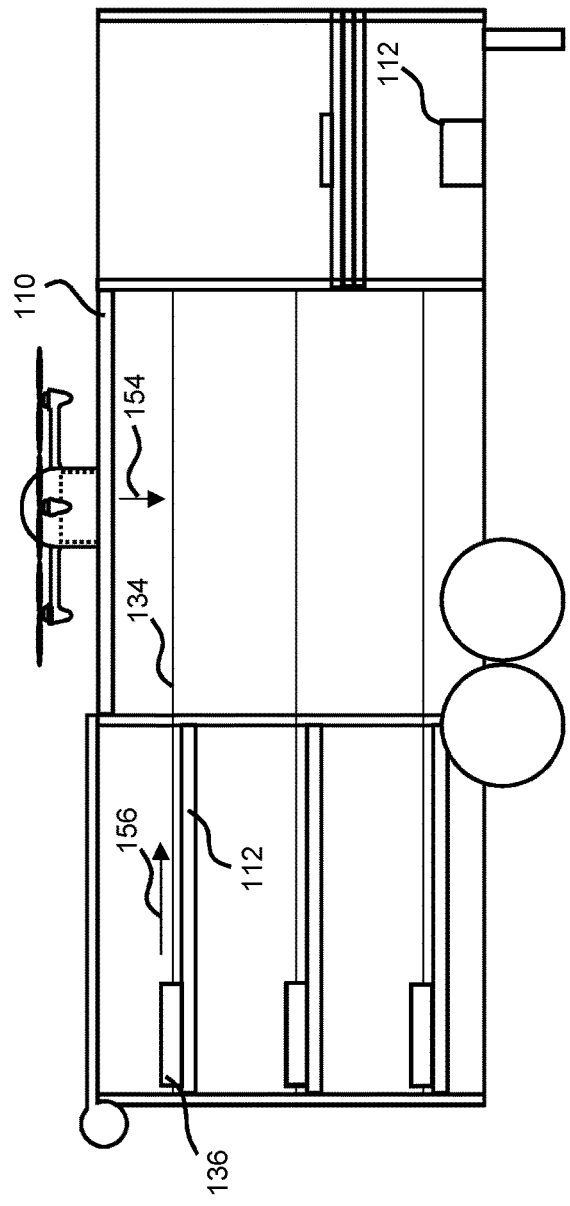
Figure 5B:
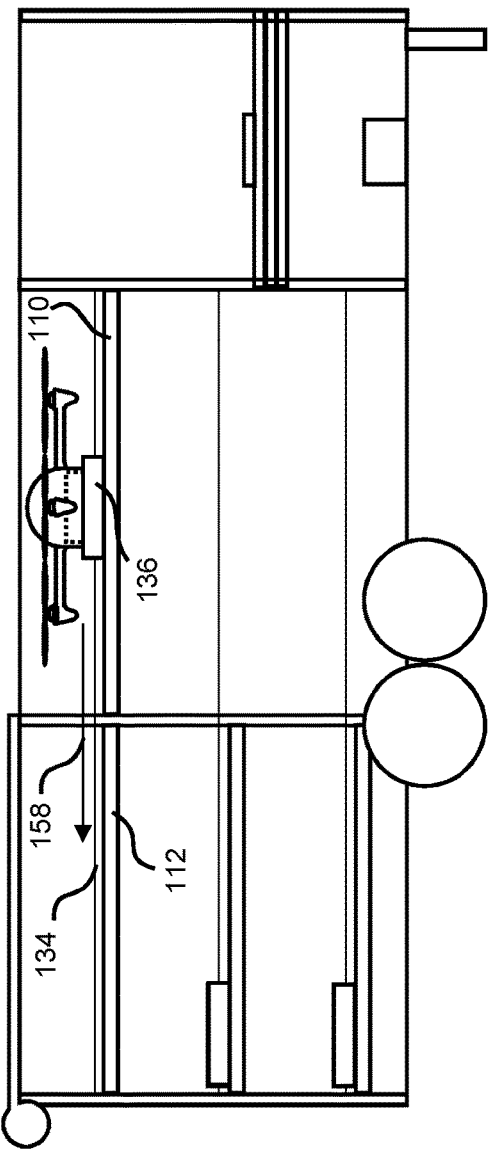

FIGS. 5A-5C depict the operation of a UAV positioning mechanism at different moments in time. In FIG. 5A an emergency UAV has landed upon the first platform 110 after returning from the scene of an accident. In this particular example, medical supplies carried by the emergency UAV were not needed. The drive system can cause the UAV to be lowered through the first opening 106 by moving the first platform in the direction of arrow 154. FIG. 5A depicts a positioning mechanism associated with the second platform 112. This particular positioning mechanism comprises a guide rail 134 and a moveable arm 136 which can move along the guide rail 134. Other types of positioning mechanisms may be used instead. The drive system can cause the moveable arm 136 to move along the guide rail 134 in the direction of arrow 154.

FIG. 5B depicts the UAV facility of FIG. 5A at a later time. Here the first platform 110 has been lowered to a height that is level with the second platform 110. The moveable arm 136 has moved along the guide rail 134 and has engaged the emergency UAV. From here, the drive system can cause the moveable arm 136 to move back along the guide rail 134 in the direction of arrow 158. Because the moveable arm 136 has engaged the UAV, movement of the arm 136 would cause the UAV to move with the arm 136.

FIG. 5C depicts the UAV facility of FIG. 5B at a later time. Here the moveable arm 136 has moved back along the guide rail 134 to move emergency UAV from the first platform 110 to the second platform 112. From here, the drive system can cause the moveable arm 136 to disengage the UAV and move along the guide rail 134 in the direction of arrow 160. The drive system can also cause the first moveable platform 110 to move in the direction of arrow 162, back into the raised position. The emergency UAV has therefore been replaced back on the second platform 112 and is ready for deployment in case of another emergency. In a similar way as described in relation to FIGS. 5A-5C, a standard UAV can be stored on any of the storage platforms located within the housing.

In some examples, the emergency UAV left its medical supplies at the scene of the accident. Thus, the returning emergency UAV in FIG. 5A may not comprise any medical supplies when it returns to the facility. To replenish the emergency supplies, the UAV facility may comprise a payload positioning mechanism configured to move a medical payload 120 to a "loading position" so that the payload can be engaged by the UAV while it is located on the first platform 110. In a similar way, a standard UAV may "become" an emergency UAV by receiving emergency supplies. This may be particularly useful to ensure that an emergency UAV is always ready for deployment, in case the usual emergency UAV is at the scene of an emergency.

FIGS. 6A and 6B depict the UAV facility of FIGS. 5A-5C at a time between that of FIGS. 5A and 5B. Here the payload positioning mechanism comprises a retractable arm 130 and a tray 128 that is attached to the retractable arm 130. The retractable arm 130 is moveable between a first, extended, position (the position in FIG. 6A) and a second, retracted, position (the position in FIG. 6B). When the retractable arm 130 is arranged in the first position, the tray 128 is positioned to receive the payload 120 at an initial position, and when the retractable arm 130 is arranged in the second position the tray 128 is positioned beneath the first platform 110. In this particular example, the retractable arm 130 extends out of the housing 102 through an ingress port when it is arranged in the first position. In other examples the tray 128 may not pass through the ingress port when the arm 130 is arranged in the first position. The tray 128 slides along the length of the arm 130 to be positioned beneath the platform 110.

The payload positioning mechanism may be operated by the same, or a different drive mechanism used to control the operation of the platforms 110, 112. Other payload positioning mechanisms are envisaged.

In this example, the first moveable platform 110 delimits an aperture 132 through which to receive the payload 120 when the payload 120 is in the loading position. In FIG. 6A, the platform aperture 132 is closed, so is not visible. FIG. 6B shows the aperture 132 in an open configuration. The drive system may be arranged to move one or more members to open the aperture 132 for example. In this way, the payload 120 can pass through the aperture 132 during loading. For example, the emergency UAV located on the first platform 110 may lower a coupling mechanism, attached to one end of a tether 162, to engage the payload 120. Once received within a compartment of the UAV, the moveable arm 136 can move along the guide rail 134 to engage the UAV as shown in FIG. 5B.

In this example, the emergency UAV is then stored on the second platform 112, as described in relation to FIGS. 5B and 5C.

In certain examples, the payload 120 comprising medical supplies is loaded into an emergency UAV only when it is determined that the UAV on the first platform 110 is an emergency UAV (or should become an emergency UAV). Accordingly, the payload positioning mechanism may be configured to determine that the UAV located on the first platform 110 is an emergency UAV. For example, the payload positioning mechanism may comprise a computer 164 comprising a controller and a wireless receiver configured to communicate with the UAV. The UAV may transmit a signal to the computer 164 which indicates the type of UAV. The computer 164 can process the received signal and determine that the UAV is an emergency UAV. The computer 164 may then cause the payload positioning mechanism to move the payload 120 into the loading position.

In a similar way as described in relation to FIGS. 6A and 6B, a standard UAV can be loaded with a standard payload. Thus, rather than moving the UAV onto the second platform 112 or onto a storage platform, the first platform 110 can move upwards to move the standard UAV through the first opening 106 to allow the standard UAV to take off and deliver the payload to a customer.

Some example UAV facilities comprise a maintenance system 166 comprising a maintenance mechanism 168 configured to perform maintenance on a UAV while it is located on the first moveable platform 100.

FIG. 7A depicts a specific maintenance system 166. In this example, the maintenance system 166 is arranged on one side of the adjacent first platform 110. On another side of the first platform 110, opposite to the maintenance system 166 is the second platform 112. The maintenance system 166 can perform maintenance on any UAV as is received within the housing via the first platform 110. For example, an emergency UAV can undergo maintenance before a UAV positioning mechanism moves the emergency UAV onto the second platform 112. Similarly, a standard UAV can undergo maintenance before a UAV positioning mechanism moves the standard UAV onto a storage platform, or before the UAV collects a payload.

In a particular example, the maintenance mechanism 168 is configured to perform maintenance on the UAV located on the first moveable platform when the first moveable platform is positioned at a position that is level with the second moveable platform 112. Thus, the drive system is configured to move the first moveable platform 110 to a position that is adjacent to, and level with, the second moveable platform 112 before any maintenance occurs. This position ensures that an emergency UAV can be moved onto the second platform 112 as soon as possible. All types of UAV can undergo maintenance in this position, regardless of their type.

In FIG. 7A, the maintenance mechanism 168 comprises a robotic arm 170 connected to a mount 172. The robotic arm 170 can move with respect to the mount 172, which is fixed in place within the housing. In other examples, the mount 172 can move within the housing, for example along one or more tracks. FIG. 7B depicts the robotic arm 170 extending into a region above the first moveable platform 110 to perform maintenance on the UAV. For example, the robotic arm 170 may refuel the UAV or replace any damaged parts of the UAV.

In this specific example however, the maintenance system is used to replace and re-charge UAV batteries. Accordingly, the maintenance system 166 further comprises a battery storage facility 174 configured to re-charge removable UAV batteries, and the robotic arm 170 is configured to remove an old battery from the UAV, position the old battery in the battery storage facility 174, remove a newly charged battery from the battery storage facility 174 and position the newly charged battery in the UAV. In this way, returning UAVs can be stored with a fully charged battery to ensure that the UAV is ready for flight.

In some example UAV facilities, the second moveable platform is located within an enclosure 184, and the enclosure 184 comprises at least one sensor 186 configured to measure environmental conditions within the enclosure 184. Based on data measured by the sensor 186, the UAV facility may alter the environmental conditions within the enclosure 184 to ensure that any medical supplies located within the enclosure 184 remain in a suitable environment. Insulin, for example, may be required to be stored at temperatures below 5 degrees Celsius. Alternatively, the facility may not have the capability to alter the environmental conditions within the enclosure 184, but the UAV facility may generate an alarm or an alert to notify an individual that the environmental conditions are insufficient for the storage of the medical supplies. For example, the UAV facility may transmit, via a network interface, the sensor data, and/or alarm data to an external facility.

In some example UAV facilities, another UAV positioning mechanism 188 is arranged on the upper portion/surface of the housing 102. Such a UAV positioning mechanism 188 can be used to move a UAV from a first position on the surface to a second position on the first moveable platform 110. Accordingly, a UAV may land on the surface 104 in the first position, and be moved onto the first moveable platform. This ensures that the UAV is correctly positioned before it is withdrawn into the housing 102.

Figure 8:
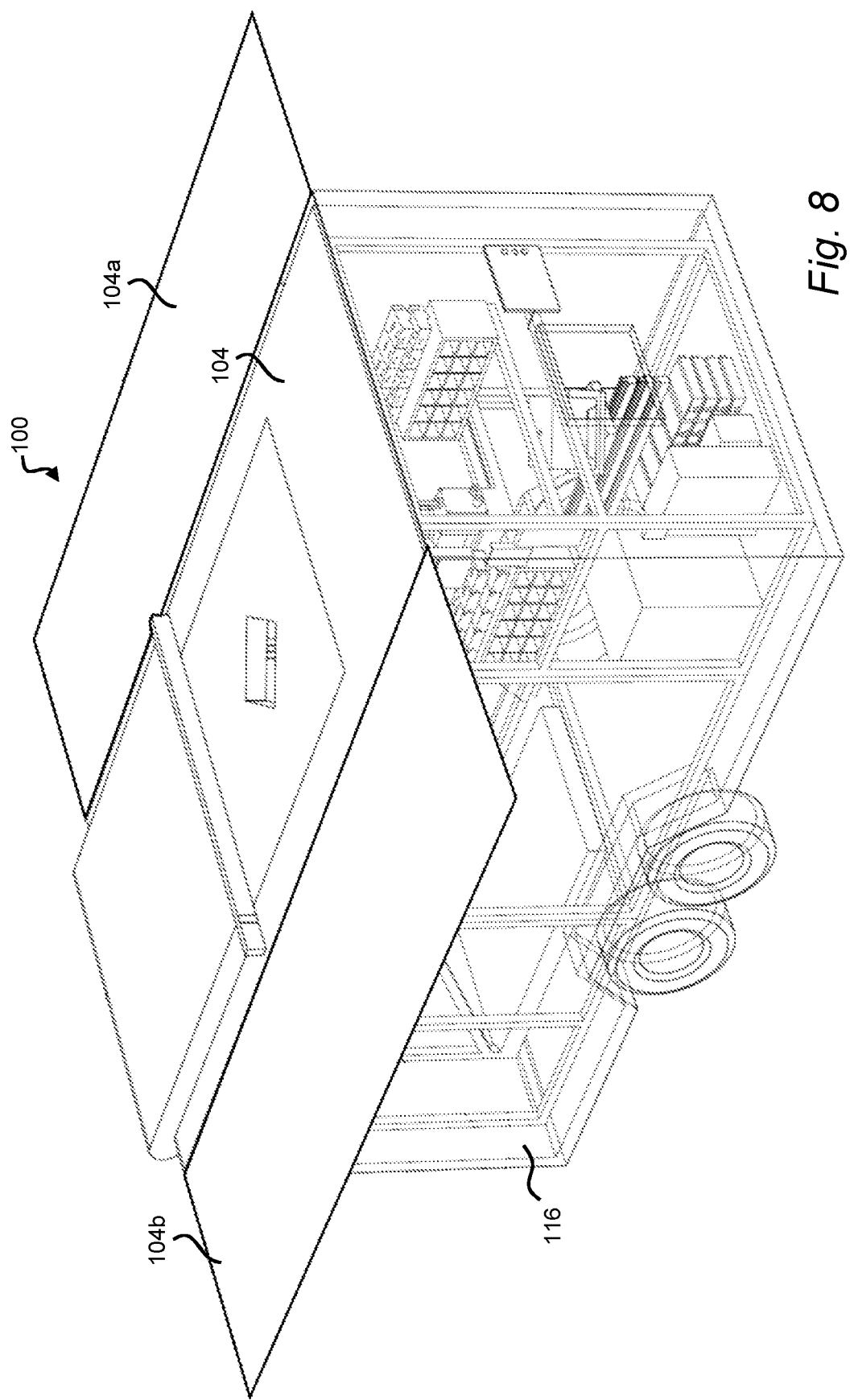
FIG. 8 is a perspective view of a UAV facility comprising an extended landing surface in accordance with an example.

Some example UAV facilities may be larger than those described earlier, or may be extendable or modular, to allow more drones to be stored on or in the facility. In a first example, the upper portion of the housing can be extended to allow more UAVs to land on the surface of the housing. Thus, the width or length of the landing surface may be increased. FIG. 8 shows an example UAV facility 100 in which the width of the landing surface 104 is extended to include additional landing areas 104a and 104b. The larger landing surface thus extends outwards from the housing over the side panels 116. In some arrangements, these extendable landing surfaces 104a, 104b may be folded down adjacent a side panel 116, and may be erected when needed. In other arrangements, the extendable landing surface may be removed entirely from the UAV facility and be affixed when required.

Alternatively, or additionally, the width of the housing may be increased, thereby also increasing the width of the landing surface. For example, rather than having a single storage platform 124 per level (as shown in FIG. 1A), there may be two or more storage platforms 124 per level.

In a second example, the height of the housing may be increased. This can allow a greater number of UAVs to be stored inside the facility. For example, rather than having two storage platforms, as depicted in the Figures, there may be three, four or more storage platforms.

In a third example, the height of the UAV facility may be increased by including multiple tiers of landing surfaces. Payloads may be transported up to the required level, and/or the UAV may be transported down into the housing to receive a payload or for maintenance or storage. Alternatively, each tier may be associated with its own UAV storage and maintenance area. This allows multiple UAVs to operate at the same time, should this be required.

In a fourth example, the UAV facility may be modular so that multiple UAV facilities may be connected or stacked on top of each other. Each UAV facility may comprise one or more components for connecting the UAV facility to at least a second UAV facility.

FIGS. 9A, 9B and 9C depict another example UAV facility 100 in which the vertical positions of the storage platforms are configurable, e.g. via a stacking structure with cross members that can be moved under hydraulic pressure or spring loading in order to lower and raise the storage platforms. FIG. 9A depicts a first storage platform 124a and a second storage platform 124b. In the configuration of FIG. 9A, the second storage platform 124b is in a stowed position. In this example, the vertical movement of the first platform 110 is restricted within the region indicated by arrow 182. This movement may be limited because one or more components/equipment of the UAV facility 100 may be located beneath the first platform 110. In this example, the movement is limited because the retractable arm 130 needs to access the region beneath the first platform 110 (as shown in FIG. 9B). To maximize storage space within the UAV facility, one or more of the storage platforms 124 may be moveable.

In FIG. 9A, a UAV 140 has landed on the UAV facility and is positioned on the first platform 110. The UAV 140 is to be stored on the first storage platform 124a. The first platform 124a therefore moves to a position adjacent the first storage platform 124a and the UAV 140 is moved onto the first storage platform 124a as shown in FIG. 9B. From here, the first storage platform 124a moves to a lower position, as shown in FIG. 9C, where the UAV 140 is stored. Similarly, the second storage platform 124b moves to a position where it can later accept another UAV for storage. Accordingly, space inside the UAV can be maximized even if the vertical positioning of the first moveable platform 110 is somewhat restricted.

Thus, in some examples, the UAV facility comprises a plurality of storage platforms configured to store a UAV when the UAV is not in use, wherein a position of at least one of the plurality of storage platforms is moveable.

Some of the example UAV facilities described may further comprise a communications system 176 having a first transceiver 178 configured to communicate with an electronic commerce facility and a second transceiver 180 configured to communicate with an emergency dispatch facility. An electronic commerce facility, for example, may be owned or operated by a business which offers goods for sale to customers. A customer can order a particular item and a standard UAV may be used to deliver the item to the customer. Accordingly, the electronic commerce facility may communicate with the UAV facility via the first transceiver 178. For example, delivery instructions may be received from the electronic commerce facility and be transmitted to the UAV via the first transceiver 178. An emergency dispatch facility may be operated by, or on behalf of a hospital. An individual may dial an emergency telephone number to request an emergency service. The emergency dispatch service may request that an emergency UAV is dispatched to provide assistance. Accordingly, the emergency dispatch facility may communicate with the UAV facility via the second transceiver 180. For example, coordinates of the scene of an accident may be received from the emergency dispatch facility and be transmitted to an emergency UAV via the second transceiver 180. The second transceiver 180 may communicate using specific frequency channels or transmission powers reserved for emergency use only.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A UAV facility, comprising:
a housing, wherein an upper portion of the housing defines a surface for receiving a UAV, and wherein the upper portion of the housing comprises a first opening and a second opening;
a first moveable platform, wherein the first moveable platform is movable to close the first opening such that the first moveable platform forms at least part of the surface;
a second moveable platform arranged adjacent to the first moveable platform;
a cover arranged above the second moveable platform to cover the second opening;
a first UAV positioning mechanism configured to move the UAV from the first moveable platform to the second moveable platform within the housing; and
a drive system, configured to:
open and close the cover; and
move the first and second platforms with respect to the upper portion of the housing, thereby to move a UAV through the first and second openings.

2. The UAV facility of claim 1, further comprising: a storage platform configured to store a first UAV when the first UAV is not in use.

3. The UAV facility of claim 2, wherein the storage platform is arranged below the second moveable platform.

4. The UAV facility of claim 2, further comprising a further UAV positioning mechanism configured to move the first UAV between the storage platform and the first moveable platform.

5. The UAV facility of claim 4, wherein the housing comprises a plurality of storage platforms, each storage platform comprising a further UAV positioning mechanism.

6. The UAV facility of claim 1, wherein the UAV positioning mechanism comprises:
a guide rail; and
a moveable arm moveably mounted on the guide rail, wherein the moveable arm is configured to engage the UAV.

7. The UAV facility of claim 2, wherein the storage platform is fixed in position with respect to the housing.

8. The UAV facility of claim 1, wherein the cover is retractable.

9. The UAV facility of claim 8, further comprising: a cover mechanism, comprising:
a first guide rail;
a second guide rail spaced apart from the first guide rail; and
the cover, wherein the cover is moveably mounted between the first and second guide rails; and
wherein the drive system is configured to:
open the cover by moving the cover along the first and second guide rails in a first direction such that the cover is retracted; and
close the cover by moving the cover along the first and second guide rails in a second direction.

10. The UAV facility of claim 9, wherein the cover mechanism further comprises a rotatable drum and one end of the cover is mounted to the drum;
wherein the drive system is configured to:
open the cover by causing the drum to rotate, such that the cover is rolled onto the drum;
close the cover by causing the drum to rotate, such that the cover is rolled off the drum.

11. The UAV facility of claim 9, wherein both the first and second guide rails extend at least partially along a side portion of the housing and at least partially along the upper portion of the housing.

12. The UAV facility of claim 1, wherein the cover comprises:
a first portion; and
a second portion;
wherein the drive system is configured to open and close the cover by moving the first and second portions with respect to each other.

13. The UAV facility of claim 1, wherein the first moveable platform defines a first area and the second moveable platform defines a second area, and wherein the first area is larger than the second area.

14. The UAV facility of claim 1, wherein the drive system is configured to:
move the first platform at a first speed; and
move the second platform at a second speed, wherein the second speed is greater than the first speed.

15. The UAV facility of claim 1, wherein the housing comprises a maintenance system arranged adjacent to the first moveable platform, wherein the maintenance system comprises a maintenance mechanism arranged to perform maintenance on a UAV located on the first moveable platform.

16. The UAV facility of claim 15, wherein:
the maintenance system is arranged on a first side of the first moveable platform;
the second moveable platform is arranged on a second side of the first moveable platform, the second side being opposite to the first side.

17. The UAV facility of claim 15, wherein:
the maintenance mechanism comprises a robotic arm connected to a mount;
the mount is fixed in position with respect to the housing; and
the robotic arm is configured to extend into a region above the first moveable platform.

18. The UAV facility of claim 17, wherein the maintenance system further comprises a battery storage facility configured to re-charge removable UAV batteries, and the robotic arm is configured to:
extend into the region to remove a battery from the UAV;
position the battery in the battery storage facility;
remove a charged battery from the battery storage facility; and
extend into the region to position the charged battery in the UAV.

19. The UAV facility of claim 15, wherein the drive system is configured to move the first moveable platform to a first position that is adjacent to, and level with, the second moveable platform, and the maintenance mechanism is configured to perform maintenance on the UAV located on the first moveable platform when the first moveable platform is positioned at the first position.

20. The UAV facility of claim 1, wherein the housing comprises a payload positioning mechanism configured to move a payload between an initial position and a loading position, wherein:
the loading position is arranged below the first platform; and
the payload is engageable by a UAV located on the first platform when the payload is at the loading position.

21. The UAV facility of claim 20, wherein the housing comprises a payload positioning mechanism configured to move a payload between an initial position and a loading position, wherein:
- the loading position is arranged below the first platform; and
- the payload is engageable by a UAV located on the first platform when the payload is at the loading position, and wherein the payload positioning mechanism is configured to:
- determine that the UAV located on the first platform is an emergency UAV configured for dispatch in the event of an emergency; and
- responsively, move a new payload from the initial position to the loading position before the first UAV positioning mechanism moves the emergency UAV from the first moveable platform to the second moveable platform.

22. The UAV facility of claim 1, wherein the second moveable platform is located within an enclosure, and wherein the enclosure comprises at least one sensor configured to measure environmental conditions within the enclosure.

23. The UAV facility of claim 1, comprising a second UAV positioning mechanism arranged on the upper portion of the housing, wherein the second UAV positioning mechanism is configured to move a UAV from a first position on the surface to a second position on the first moveable platform.

24. The UAV facility of claim 1, further comprising:
- a communications system comprising:
  - a first transceiver configured to communicate with an electronic commerce facility; and
  - a second transceiver configured to communicate with an emergency dispatch facility.

* * * * *